United States Patent
Yuan et al.

(10) Patent No.: US 12,425,976 B2
(45) Date of Patent: Sep. 23, 2025

(54) UPLINK POWER CONTROL (ULPC) INDICATION BY ASSOCIATING A ULPC CONFIGURATION AND A TRANSMISSION CONFIGURATION INDICATOR (TCI)

(71) Applicant: QUALCOMM Incorporated, San Diego, CA (US)

(72) Inventors: Fang Yuan, Beijing (CN); Yan Zhou, San Diego, CA (US); Wooseok Nam, San Diego, CA (US); Mostafa Khoshnevisan, San Diego, CA (US); Tao Luo, San Diego, CA (US); Xiaoxia Zhang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 533 days.

(21) Appl. No.: 17/918,526

(22) PCT Filed: Apr. 17, 2020

(86) PCT No.: PCT/CN2020/085406
§ 371 (c)(1),
(2) Date: Oct. 12, 2022

(87) PCT Pub. No.: WO2021/208086
PCT Pub. Date: Oct. 21, 2021

(65) Prior Publication Data
US 2023/0164699 A1    May 25, 2023

(51) Int. Cl.
*H04W 52/14*    (2009.01)
*H04W 52/24*    (2009.01)

(52) U.S. Cl.
CPC ........ *H04W 52/146* (2013.01); *H04W 52/241* (2013.01); *H04W 52/242* (2013.01)

(58) Field of Classification Search
CPC ............. H04W 52/146; H04W 52/241; H04W 52/242; H04W 52/42; H04W 52/226
See application file for complete search history.

(56) References Cited

U.S. PATENT DOCUMENTS

| | | | |
|---|---|---|---|
| 2019/0159136 A1 | 5/2019 | Molavianjazi et al. | |
| 2019/0261280 A1* | 8/2019 | Jung | .......... H04W 52/386 |

(Continued)

FOREIGN PATENT DOCUMENTS

| | | |
|---|---|---|
| CN | 109660286 A | 4/2019 |
| CN | 110167126 A | 8/2019 |
| WO | 2019049107 A1 | 3/2019 |

OTHER PUBLICATIONS

Huawei, et al., "Beam Indication for Control and Data Channels", 3GPP Draft, 3GPP TSG RAN WG1 Meeting 90bis, R1-1718238, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Oct. 9, 2017-Oct. 13, 2017, Oct. 8, 2017 (Oct. 8, 2017), XP051341420, 8 Pages, Retrieved from the Internet:URL:http://www.3gpp.org/ftp/Meetings_3GPP_SYNC/RAN1/Docs/ [retrieved on Oct. 8, 2017], p. 2-p. 4.

(Continued)

*Primary Examiner* — Ankur Jain

(57) ABSTRACT

The apparatus determines an association between one or more transmission configuration indicators (TCIs) and one or more corresponding uplink power control (ULPC) configurations based on a control message, receives control information indicating a transmission configuration indicator (TCI) for a transmission on an uplink (UL) channel, and determines a transmission power for the transmission on the uplink (UL) channel based on an uplink power control (ULPC) configuration associated with the transmission configuration indicator (TCI).

21 Claims, 16 Drawing Sheets

(56) References Cited

U.S. PATENT DOCUMENTS

2019/0261281 A1    8/2019  Jung et al.
2019/0261338 A1*   8/2019  Akkarakaran ...... H04W 72/046

OTHER PUBLICATIONS

Huawei et al., "Correction on Resetting Accumulation of Closed-Loop Power Control", 3GPP Draft, 3GPP TSG-RAN WG1 Meeting #100-e, R1-2001473, Feb. 24-Mar. 6, 2020, 7 Pages.
International Search Report and Written Opinion—PCT/CN2020/085406—ISA/CN—Jan. 15, 2021.
Supplementary Partial European Search Report—EP20931046—Search Authority—The Hague—Dec. 8, 2023.
ZTE: "Enhancements on Multi-beam Operation", 3GPP TSG RAN WG1 Meeting #96, R1-1901635, Enhancements on multi-beam operation, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019, XP051599332, 18 pages, section 2.2.3; p. 9, sections 2.1.3.
CATT: "Consideration on Multi-Beam Enhancements", 3GPP Draft, 3GPP TSG RAN WG1 Meeting #98, R1-1908603, 3rd Generation Partnership Project (3GPP), Mobile Competence Centre; 650, Route Des Lucioles; F-06921 Sophia-Antipolis Cedex; France, vol. RAN WG1, No. Prague, CZ; Aug. 26, 2019-Aug. 30, 2019, Aug. 17, 2019 (Aug. 17, 2019), XP051765211, 7 Pages, chapter 3; pp. 3,4, p. 2, paragraph section 2.1—p. 3, paragraph section 2.2, the whole document.
Huawei et al., "Further Details on Beam Indication", 3GPP Draft, R1-1719806, 3GPP TSG RAN WG1 Meeting #91, 3rd Generation Partnership Project (3GPP), Mobile Competence Centre, 650, Route Des Lucioles, F-06921 Sophia- Antipolis Cedex, France, vol. RAN WG1, No. Reno, USA, Nov. 27, 2017-Dec. 1, 2017 Nov. 17, 2017 (Nov. 17, 2017), XP051369186, 12 Pages, the whole document.
Supplementary European Search Report—EP20931046—Search Authority—The Hague—Feb. 21, 2024.

* cited by examiner

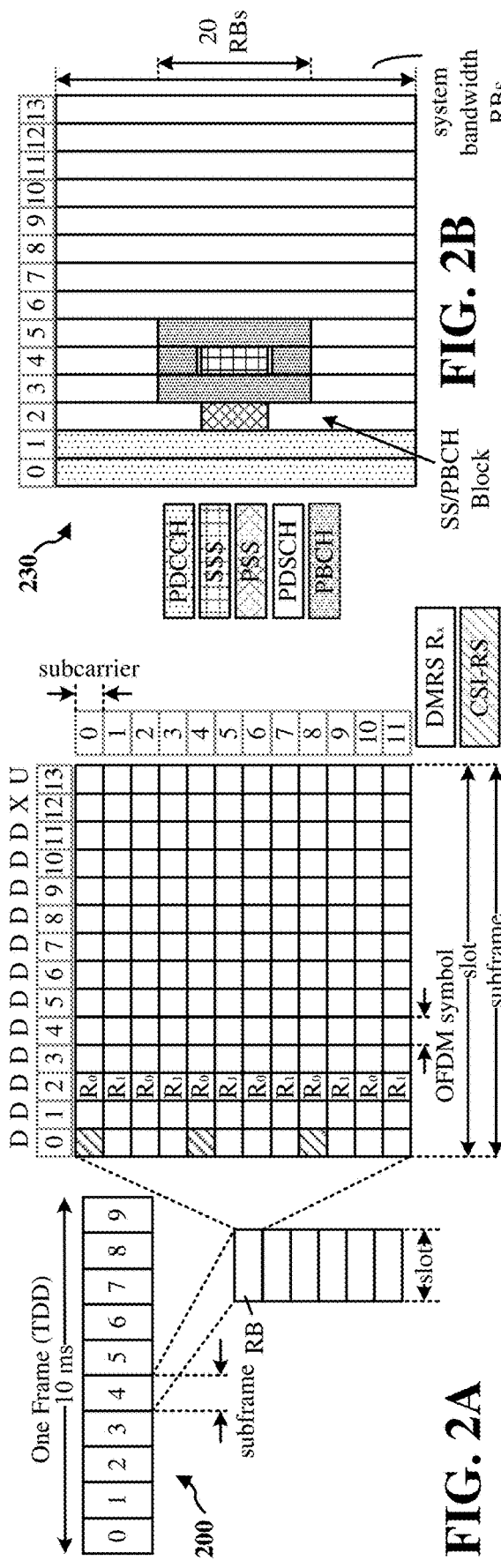
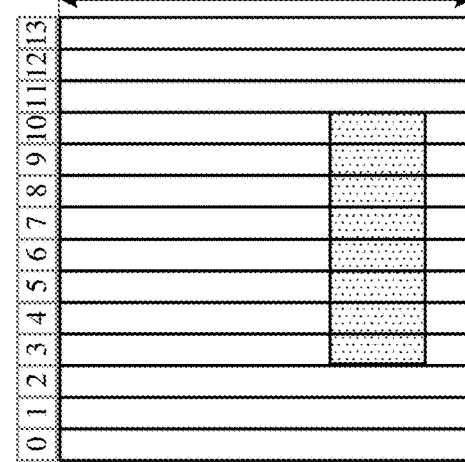
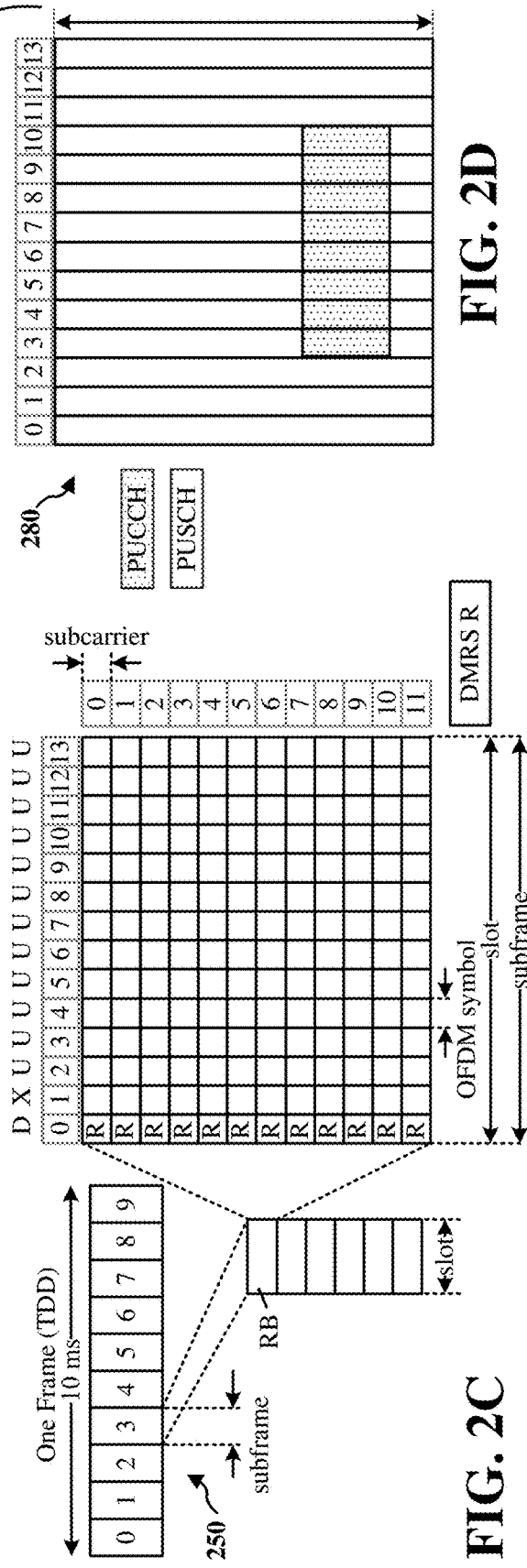
FIG. 2A  FIG. 2B  FIG. 2C  FIG. 2D

| Valid UL-TCI state Configuration | Source (reference) RS | (target) UL RS | [qcl-Type] |
|---|---|---|---|
| 1 | SRS resource (for BM) + [panel ID] | DM-RS for PUCCH or SRS or PRACH | Spatial-relation |
| 2 | DL RS(a CSI-RS resource or a SSB) + [panel ID] | DM-RS for PUCCH or SRS or PRACH | Spatial-relation |
| 3 | DL RS(a CSI-RS resource or a SSB) + [panel ID] | DM-RS for PUSCH | Spatial-relation + [port(s)-indication] |
| 4 | DL RS(a CSI-RS resource or a SSB) and SRS resource + [panel ID] | DM-RS for PUSCH | Spatial-relation + [port(s)-indication] |
| 5 | SRS resource + [panel ID] | DM-RS for PUSCH | Spatial-relation + [port(s)-indication] |
| 6 | UL RS(a SRS for BM) and SRS resource + [panel ID] | DM-RS for PUSCH | Spatial-relation + [port(s)-indication] |

FIG. 5

UPLINK POWER CONTROL (ULPC) INDICATION BY ASSOCIATING A ULPC CONFIGURATION AND A TRANSMISSION CONFIGURATION INDICATOR (TCI)

CROSS REFERENCE TO RELATED APPLICATION(S)

This application is the U.S. national stage of PCT patent application number PCT/CN2020/085406 filed on Apr. 17, 2020.

BACKGROUND

Technical Field

The present disclosure relates generally to communication systems, and more particularly, to uplink power control (ULPC) indication by associating a ULPC configuration and a transmission configuration indicator (TCI).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (CDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus determines an association between one or more transmission configuration indicators (TCIs) and one or more corresponding uplink power control (ULPC) configurations based on a control message, receives control information indicating a transmission configuration indicator (TCI) for a transmission on an uplink (UL) channel, and determines a transmission power for the transmission on the uplink (UL) channel based on an uplink power control (ULPC) configuration associated with the transmission configuration indicator (TCI).

In an aspect of the disclosure, a method, a computer-readable medium, and an apparatus are provided. The apparatus determines that no transmission configuration indicators (TCIs) have been configured for an uplink (UL) channel, determines a transmission configuration indicator (TCI) configured for a downlink (DL) channel, and applies the transmission configuration indicator (TCI) configured for the downlink (DL) channel for a transmission in the uplink (UL) channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 5 is a diagram illustrating example uplink transmission configuration indicator (UL-TCI) states.

DETAILED DESCRIPTION

Figure 1:
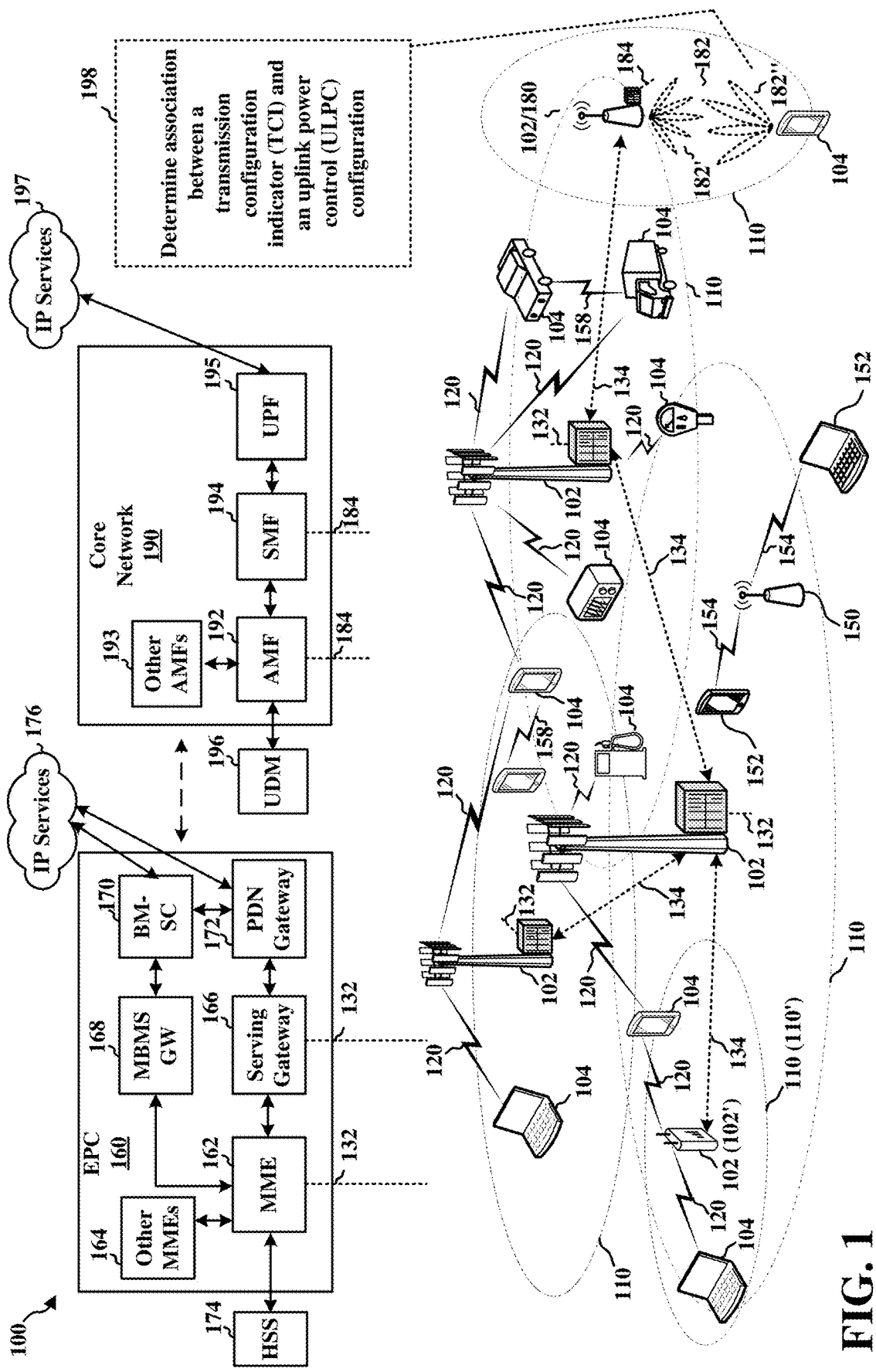
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to determine an association between a transmission configuration indicator (TCI) and an uplink power control (ULPC) configuration (198). The UE 104 may determine a transmission power for an uplink (UL) channel in a certain TCI state based on the association between the TCI and ULPC configuration.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
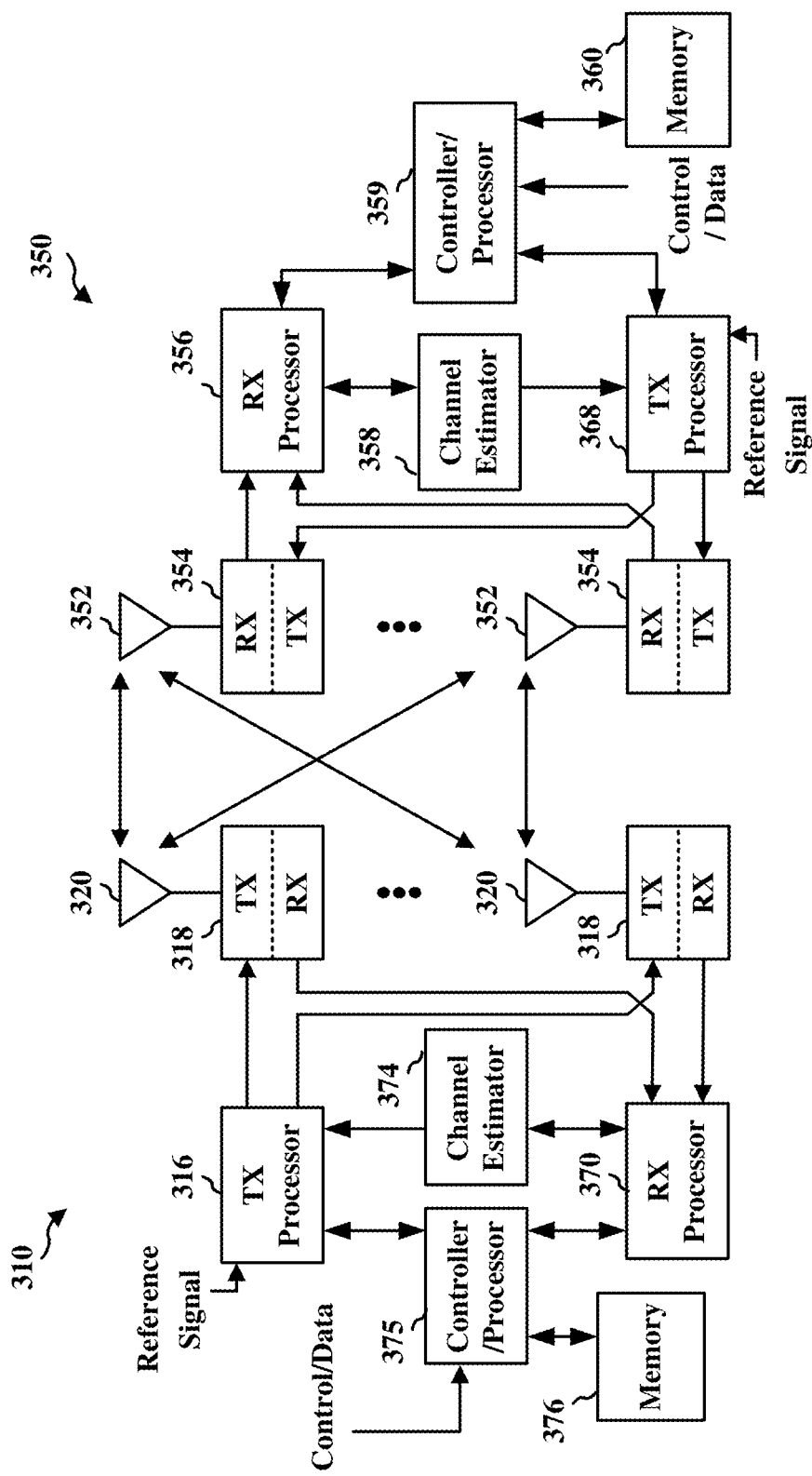
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

Figure 4:
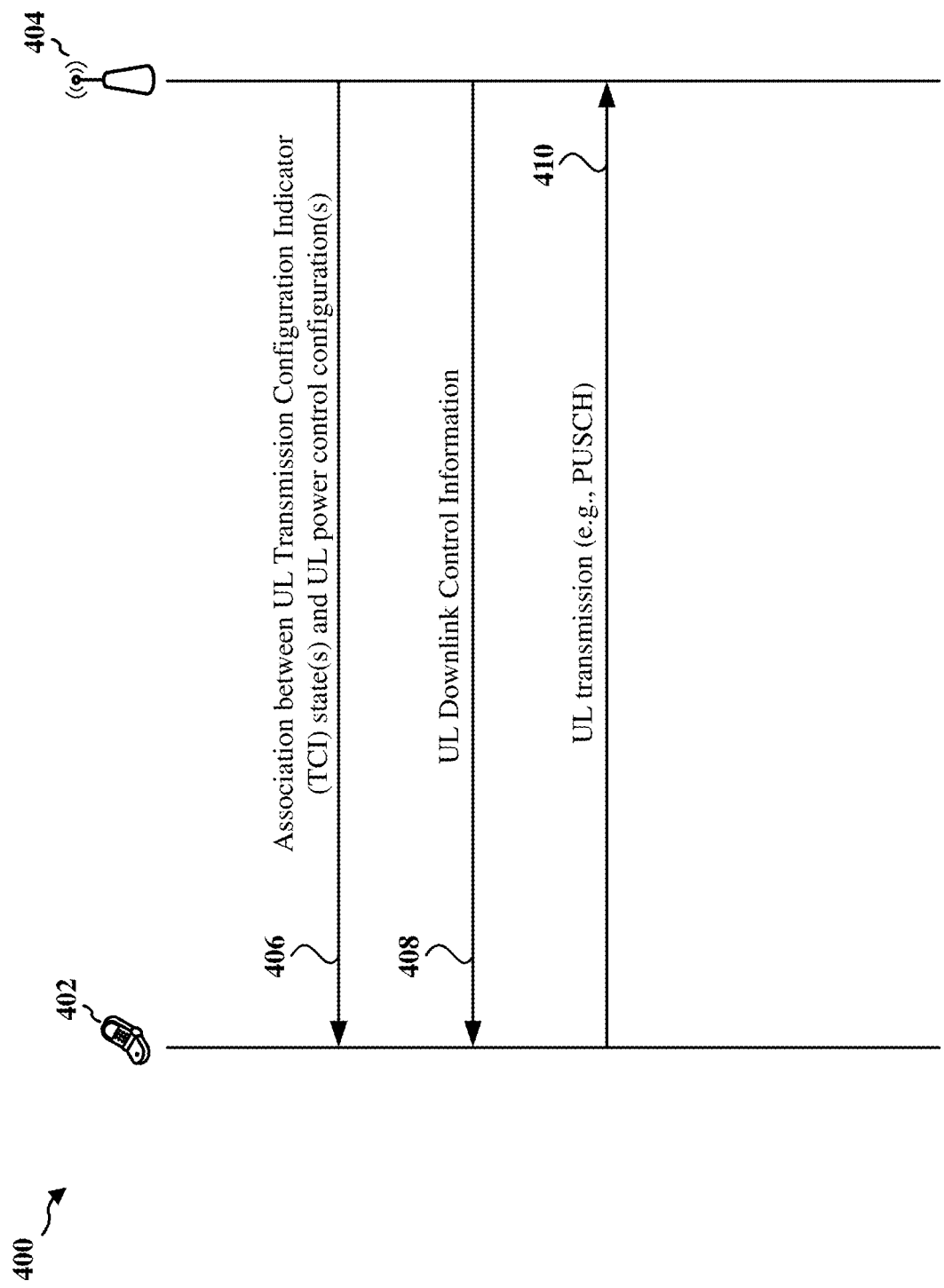
FIG. 4 is a signal flow diagram in accordance with various aspects of the present disclosure.

FIG. 4 is a signal flow diagram 400 in accordance with various aspects of the present disclosure. As shown in FIG. 4, a base station 404 may transmit a control message 406 to a UE 402. The control message 406 may indicate an association between one or more uplink (UL) Transmission Configuration Indicator (TCI) states and respective one or more UL power control (ULPC) configurations. For example, and as described in detail herein, a ULPC configuration may include information that enables the UE 402 to determine a transmission power for the PUSCH. As further shown in FIG. 4, the base station 404 may transmit UL downlink control information (DCI) 408. In some examples, the UL DCI 408 may indicate a TCI state for the UE 402. The UE 402 may determine the ULPC configuration associated with the TCI state based on the control message 406 and may determine a transmit power for PUSCH based on the ULPC configuration. In some aspects, the UE may determine the ULPC configuration from a TCI field in the DCI 408. The UE 402 may then perform a UL transmission 410 (e.g., a data transmission) to the base station 404 according to the transmit power on the PUSCH.

FIG. 5 is a diagram 500 illustrating example UL-TCIs (also referred to as UL-TCI states). As shown in FIG. 5, each UL-TCI state configuration 502 may include a source reference RS 504, an uplink (UL) RS 506, and a Quasi co-location type (qcl-Type) 508. In some examples, the source reference RS 506 may be a sounding reference signal (SRS), a channel state information reference signal (CSI-RS), or a synchronization signal block (SSB). A UL-TCI state may be said to indicate a beam for UL transmissions on PUSCH.

Figure 6:
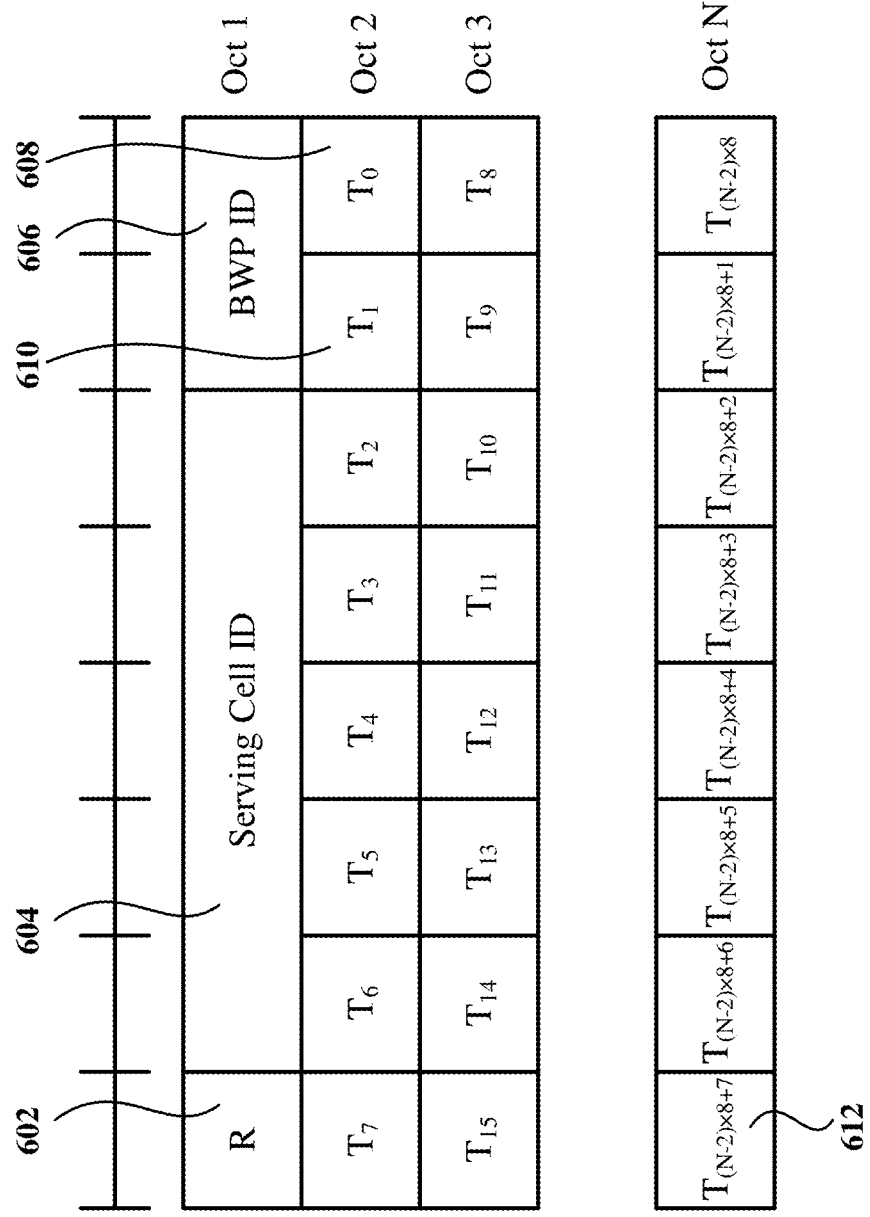
FIG. 6 illustrates an example UE-specific physical uplink shared channel (PUSCH) medium access control (MAC) control element (MAC-CE) for UL-TCI state activation/deactivation.

FIG. 6 illustrates an example UE-specific PUSCH MAC-CE 600 for UL-TCI state activation/deactivation. A base station may configure multiple UL-TCI states for indicating different beams for UL transmissions (e.g., transmissions on the PUSCH). For example, a base station may configure up to 128 UL-TCI states. In some networks, a DCI may not have the capacity to indicate 128 different UL-TCI states. However, the DCI may be configured to indicate up to eight different UL-TCI states from the 128 UL-TCI states.

For example, the base station may activate up to eight of the 128 UL-TCI states using the UE-specific PUSCH MAC-CE 600. As shown in FIG. 6, the UE-specific PUSCH MAC-CE 600 may include a reserved bit field 602, a serving cell ID field 604, a bandwidth part ID (BWP ID) field 606, and a bitmap where each bit in the bitmap (e.g., bit $T_0$ 608, bit $T_1$ 610, ... bit $T_{(N-2)\times 8+7}$ 612) corresponds to a TCI state. Therefore, when a bit (e.g., bit $T_0$ 608) in the bitmap is set to '1', the TCI state corresponding to that bit (e.g., a first TCI state) is activated, whereas when a bit (e.g., bit $T_1$ 610) in the bitmap is set to '0', the TCI state corresponding to that bit (e.g., a second TCI state) is deactivated. The bits set to '1' in the bitmap may be assigned to one of eight possible codepoints in ascending order. For example, if bit $T_0$ 608, bit $T_1$ 610, and bit $T_{(N-2)\times 8+7}$ 612 are set to '1' and the remaining bits in the bitmap are set to '0', then codepoint 0 may be set to $T_0$, codepoint 1 may be set to $T_1$, and codepoint 2 may be set to $T_{(N-2)\times 8+7}$. For example, a UE may receive a MAC-CE command that includes the UE-specific PUSCH MAC-CE 600 and may map the activated TCI states to codepoints (e.g., codepoint 0 up to codepoint 7). A transmission configuration indication (TCI) field in the DCI can include a codepoint to signal a UL-TCI state to the UE.

If a UE transmits a PUSCH on active UL BWP b of carrier f of serving cell c using a parameter set configuration with index j and PUSCH power control adjustment state with index l, the UE may determine the PUSCH transmission power in PUSCH transmission occasion i based on equation (1):

$$P_{PUSCH,b,f,c}(i, j, q_d, l) = \min \begin{cases} P_{CMAX,f,c}(i), \\ P_{O\_PUSCH,b,f,c}(j) + 10\log_{10}(2^\mu \cdot M_{RB,b,f,c}^{PUSCH}(i)) + \\ \alpha_{b,f,c}(j) \cdot PL_{b,f,c}(q_d) + \Delta_{TF,b,f,c}(i) + f_{b,f,c}(i, l) \end{cases}$$ (equation 1)

where $P_{PUSCH,b,f,c}(i, j, q_d, l)$ is the PUSCH transmission power, $P_{CMAX,f,c}(i)$ is the UE configured maximum output power for carrier f of serving cell c in PUSCH transmission occasion i, $P_{O\_PUSCHb,f,c}(j)$ is a parameter composed of the sum of a component $P_{O\_NOMINAL\_PUSCH,f,c}(j)$ and a component $P_{O\_UE\_PUSCH,b,f,c}(j)$ where $j \in \{0, 1, \ldots, J-1\}$, $M_{RB,b,f,c}^{PUSCH}$ is the bandwidth of the PUSCH resource assignment expressed in number of resource blocks for PUSCH transmission, $\alpha_{b,f,c}$ represents the path loss compensation factor, $PL_{b,f,c}$ may represent a downlink pathloss estimate in dB determined by the UE using reference signal (RS) index $q_d$ for the active DL BWP, $\Delta_{TF,f,c}$ may represent the MCS related adjustment, and $f_{b,f,c}$ may represent the PUSCH power control adjustment state with closeloopindex l. In some examples, $P_{OPUSCH,b,f,c}$ may represent the target signal-to-interference-plus-noise-ratio (SINR) determined by the P0 value. It should be noted that the value of $P_{PUSCH,b,f,c}(i,j,q_d,l)$ is subject to $P_{PUSCH,b,f,c}(i,j,q_d,l)$ (e.g., $P_{PUSCH,b,f,c}(i, j, q_d, l)$ may not exceed $P_{CMAX,f,c}(i)$).

In some examples, the transmit power of the PUSCH may be controlled with a UL power control parameter set. In one example, the UL power control parameter set may be defined by an information element (IE) herein referred to as SRI-PUSCH-PowerControl. SRI-PUSCH-PowerControl may include any of four parameters, such as sri-PUSCH-PowerControlId which identifies a power control parameter set, sri-PUSCH-PathlossReferenceRS-Id which identifies a path loss reference signal, sri-P0-PUSCH-AlphaSetId which identifies a P0 value and a path loss compensation factor, and sri-PUSCH-ClosedLoopindex which identifies a close loop index. A UE may use the values set for these four parameters to determine the PUSCH transmission power (e.g., $P_{PUSCH,b,f,c}(i,j,q_d,l)$ as defined in equation (1)). Table 1 shows an example structure of the SRI-PUSCH-PowerControl IE in the Abstract Syntax Notation One (ASN.1) notation format.

TABLE 1

| | |
|---|---|
| SRI-PUSCH-PowerControl ::= | SEQUENCE{ |
| sri-PUSCH-PowerControlId | SRI-PUSCH-PowerControlId, |

TABLE 1-continued

```
sri-PUSCH-PathlossReferenceRS-Id    PUSCH-PathlossReferenceRS-Id,
sri-P0-PUSCH-AlphaSetId             P0-PUSCH-AlphaSetId,
sri-PUSCH-ClosedLoopIndex           ENUMERATED { i0, i1 }
}
```

UL-TCI Configuration

A UL-TCI may provide a beam indication to a UE (e.g., UE 402) by referring to a reference signal (RS). In some examples, the RRC layer may configure a UL-TCI for the UE by providing an information element (IE) via RRC signaling. Table 2 shows a structure of a first example UL-TCI-State IE in the ASN.1 notation format. In Table 2, UL-TCI-State IE includes a ul-TCI-stat-Id and ul-qcl-Type. The ul-qcl-Type parameter may indicate the configuration of the TCI state associated with the ul-TCI-stat-Id. An example of the UL-QCL-Info IE defining the ul-qcl-Type parameter is provided herein with reference to Table 3.

TABLE 2

```
UL-TCI-State ::= SEQUENCE {
    ul-TCI-stat-Id  UL-TCI-stat-Id,
    ul-qcl-Type     UL-QCL-Info,
}
```

As shown in Table 3, the UL-QCL-Info IE may include a serving cell identifier (e.g., cellId), a physical cell identifier (PCI) which identifies the cell at the physical layer (e.g., physCellId), a bandwidth part identifier (e.g., bwp-Id), and a reference signal (RS) (e.g., referenceSignal). The reference signal (RS) (e.g., referenceSignal) may indicate a CSI-RS, a synchronization signal block (SSB), or an SRS. The information of bwp-Id for the CSI-RS may be not configured and default as the active bandwidth part in the serving cell.

TABLE 3

```
UL-QCL-Info ::= SEQUENCE {
    cellId ServCellIndex,
    physCellId, PhysCellId    --Cond SSB-Indicated
    bwp-Id BWP-Id    --Cond CSI-RS and SRS -Indicated
    referenceSignal CHOICE {
    csi-rsId NZP-CSI-RS-ResourceId,
    ssbId SSB-Index,
    srsId SRS-ResourceId
}
```

As previously mentioned, the RRC layer may configure a UL-TCI for the UE by providing an information element (IE) via RRC signaling. Table 4 shows a structure of a second example UL-TCI-State IE in the ASN.1 notation format. In Table 4, UL-TCI-State IE includes a ul-TCI-stat-Id, a serving cell ID (e.g., servingCellId) and a reference signal (RS) identifier (e.g., refereceRS-ID). The reference signal (RS) identifier may indicate a synchronization signal block (SSB), a CSI-RS, or an SRS. The information of bwp-Id for the CSI-RS may be not configured and default as the active bandwidth part in the serving cell.

TABLE 4

```
UL-TCI-State ::= SEQUENCE{
    ul-TCI-stat-ID                UL-TCI-stat-Id
    servingCellId                 ServCellIndex
    referenceRS--ID               CHOICE{
    ssb-Index SSB-Index sequence{physCellId, PhysCellId}
    csirs SEQUENCE{resource NZP-CSI-ResourceId, bwp-Id
        BWP-Id }
```

TABLE 4-continued

```
    srs SEQUENCE{resource SRS-ResourceId, uplinkBWP
        BWP-Id } }
}
```

In some aspects of the disclosure, when a UL-TCI is not configured by the RRC layer signaling, the downlink TCI (DL-TCI) configured for the PDSCH for the same BWP may be applied for UL-TCI. For example, a UL-TCI can refer to a DL-TCI, and the UL-TCI pool is the same as DL-TCI pool.

Association Between UL-TCI and ULPC Based on RRC Configuration

In some aspects of the disclosure, the RRC layer may configure an association between an uplink transmission control indicator (UL-TCI) and an uplink power control (ULPC) configuration. For example, the ULPC configuration may include a UL power control parameter set that enables the UE to determine the PUSCH transmission power (e.g., $P_{PUSCH,b,f,c}(i,j,q_d,l)$ as defined in equation (1)). Therefore, in this example, the UL power control parameter set may be associated with a certain TCI state, and a UE may use the UL power control parameter set to determine the PUSCH transmission power in that TCI state. The ULPC configuration may be indicated by a TCI field in UL DCI.

Table 5 shows a structure of a first example UL-TCI-State IE in the ASN.1 notation format. In Table 5, it should be noted that the UL-TCI-State IE defines a direct association between a TCI state (e.g., indicated by ul-TCI-stat-Id) and UL power control parameter set including any of the pathlossReferenceRS-Id, p0-Id, alpha-Id, and closedLoopindex. In the UL-TCI-State IE of Table 5, the reference signal (RS) (e.g., indicated by refereceRS-ID) may be a synchronization signal block (SSB), a CSI-RS, or an SRS. The physCellId (PCI) may be included in the UL-TCI-State IE. Each cell ID may correspond to one or more PCIs. The information of bwp-Id for the CSI-RS may be not configured and default as the active bandwidth part in the serving cell.

TABLE 5

```
UL-TCI State:: = SEQUENCE{
    ul-TCI-stat-Id UL-TCI-stat-Id
    servingCellId ServCellIndex
    refereceRS-ID CHOICE{
        ssb-Index SSB-Index sequence {physCellId, PhysCellId}
        csi-RS-Index CSI-RS-Index SEQUENCE {bwp-Id BWP-Id }
        srs SEQUENCE{ resource SRS-ResourceId,
            uplinkBWP BWP-Id } }
    pathlossReferenceRS-Id PathlossReferenceRS-Id
    p0-Id P0-Id,
    alpha-Id Alpha-Id,
    closedLoopIndex ENUMERATED { i0, i1 }
}
```

Table 6 shows a structure of a second example UL-TCI-State IE in the ASN.1 notation format. In Table 6, it should be noted that the UL-TCI-State IE defines an indirect association between a TCI state (e.g., indicated by ul-TCI-stat-Id) and a UL power control parameter set represented by sri-PUSCH-powercontrolID. For example, the association between a TCI state and a UL power control parameter set may be considered indirect in Table 6 because the UL-TCI-State IE includes an identifier (e.g., sri-PUSCH-powercontrolID) that refers to the UL power control parameter set. In other words, the UL control parameter set may not be explicitly indicated in the UL-TCI-State IE, and instead may be separately obtained using the identifier (e.g., sri-PUSCH-powercontrolID). The sri-PUSCH-powercontrolID may define any of the pathlossReferenceRS-Id, p0-Id, alpha-Id, and closedLoopindex parameters according to the SRI-PUSCH-PowerControl IE previously described with reference to Table 1. In the UL-TCI-State IE of Table 6, the reference signal (RS) (e.g., indicated by refereceRS-ID) may be a synchronization signal block (SSB), a CSI-RS, or an SRS. The physCellId (PCI) may be included in the UL-TCI-State IE. Each cell ID may correspond to one or more PCIs. The information of bwp-Id for the CSI-RS may be not configured and default as the active bandwidth part in the serving cell.

TABLE 6

UL-TCI-State ::= SEQUENCE{
  ul-TCI-stat-Id, UL-TCI-stat-Id
  servingCellId, ServCellIndex
  refereceRS-ID, CHOICE{
    ssb-Index SSB-Index sequence{physCellId, PhysCellId}
    csi-RS-Index, CSI-RS-Index SEQUENCE} bwp-Id BWP-Id }
  srs SEQUENCE{ resource SRS-ResourceId,
    uplinkBWP BWP-Id } }
  sri-PUSCH-PowercontrolID, SRI-PUSCH-PowercontrolID
}

Table 7 shows a structure of a third example UL-TCI-State IE in the ASN.1 notation format. In Table 7, it should be noted that the UL-TCI-State IE defines an indirect association between a TCI state (e.g., indicated by ul-TCI-stat-Id) and a UL power control parameter set represented by sri-PUSCH-powercontrolID. For example, the association between a TCI state and a UL power control parameter set may be considered indirect in Table 7 because the UL-TCI-State IE includes an identifier (e.g., sri-PUSCH-powercontrolID) that refers to the UL power control parameter set. In other words, the UL control parameter set may not be explicitly indicated in the UL-TCI-State IE, and instead may be separately obtained using the identifier (e.g., sri-PUSCH-powercontrolID). The sri-PUSCH-powercontrolID may define the pathlossReferenceRS-Id, p0-Id, alpha-Id, and closedLoopindex parameters according to the SRI-PUSCH-PowerControl IE previously described with reference to Table 1. In the UL-TCI-State IE of Table 7, the ul-qcl-Type IE may indicate the configuration of the TCI state associated with the ul-TCI-stat-Id. An example of the UL-QCL-Info IE is provided herein with reference to Table 3.

TABLE 7

UL-TCI-State ::= SEQUENCE {
  ul-TCI-stat-Id UL-TCI-stat-Id,
  ul-qcl-Type UL-QCL-Info,
  sri-PUSCH-PowercontrolID
  SRI-PUSCH-PowercontrolID
}

In some aspects of the disclosure, the RRC layer may configure an association between an uplink transmission control indicator (UL-TCI) and an uplink power control (ULPC) configuration with a first example dedicated RRC message. For example, in scenarios where the DCI does not include a sounding reference signal resource indication (SRI) field, but does include a TCI field, the uplink power control (ULPC) configuration to be used by the UE for determining the PUSCH transmission power (e.g., $P_{PUSCH,b,f,c}(i,j,q_d,l)$ as defined in equation (1)) may be indicated by the UL-TCI state indicated in the TCI field. In other words, the UE may determine the uplink power control (ULPC) configuration based on the TCI field of the UL DCI and the association between the UL-TCI and the ULPC configuration defined in the first example dedicated RRC message.

Table 8 shows a structure of a first example dedicated RRC message for configuring an association between a UL-TCI state and a ULPC. In Table 8, the UL-TCI-state-and-SRI-association IE expressed in the ASN.1 notation format may represent one example implementation of the previously discussed first example dedicated RRC message. In Table 8, the ul-TCI-stat-Id may indicate the UL-TCI state as defined by the UL-TCI-State IE shown in Table 9. The sri-PUSCH-powercontrolID may indicate the ULPC configuration (e.g., a UL power control parameter set) associated with that UL-TCI state. For example, the sri-PUSCH-powercontrolID may define any of the pathlossReferenceRS-Id, p0-Id, alpha-Id, and closedLoopindex parameters according to the SRI-PUSCH-PowerControl IE previously described with reference to Table 1. Therefore, when the UE receives the UL-TCI-state-and-SRI-association IE shown in Table 8 by RRC signaling, and also received the UL-TCI indicated by the TCI field in the UL DCI, the UE may determine the UL power control parameter set (e.g., as defined by sri-PUSCH-PowercontrolID in the UL-TCI-state-and-SRI-association IE) to be used in that TCI state based on the association configured in the UL-TCI-state-and-SRI-association IE.

TABLE 8

UL-TCI-state-and-SRI-association ::= SEQUENCE {
  ul-TCI-stat-Id,
  sri-PU SCH-PowercontrolID
}

TABLE 9

UL-TCI-State ::= SEQUENCE {
  ul-TCI-stat-Id UL-TCI-stat-Id,
  ul-qcl-Type UL-QCL-Info,
}

In some aspects of the disclosure, the RRC layer may configure an association between an uplink transmission control indicator (UL-TCI) and an uplink power control (ULPC) configuration with a second example dedicated RRC message. For example, in scenarios where the DCI includes both an SRI field and a TCI field, the uplink power control (ULPC) configuration to be used by the UE for determining the PUSCH transmission power (e.g., $P_{PUSCH,b,f,c}(i,j,q_d,l)$ as defined in equation (1)) may be indicated by an SRI and UL-TCI state pair. The uplink power control (ULPC) configuration may be a UL power control parameter set indicated by sri-PUSCH-PowercontrolID. In other words, the UE may receive an SRI and a UL-TCI state in UL DCI and may determine an uplink power control (ULPC) configuration (e.g., which may be included in the UL DCI) associated with the SRI and UL-TCI state as defined in the second example dedicated RRC message.

Table 10 shows a structure of the second example dedicated RRC message for configuring an association between an SRI and UL-TCI state pair and a ULPC configuration. In Table 10, the UL-TCI-state-and-SRI-and-ULPC association IE expressed in the ASN.1 notation format may represent one example implementation of the previously discussed second example dedicated RRC message. In Table 10, the ul-TCI-stat-Id may indicate the UL-TCI state as defined by the UL-TCI-State IE shown in Table 9. The sri-ID may represent the SRI. The sri-PUSCH-powercontrolID may indicate the ULPC configuration (e.g., a UL power control parameter set) associated with the sri-ID and ul-TCI-stat-Id pair. For example, the sri-PUSCH-powercontrolID may define any of the pathlossReferenceRS-Id, p0-Id, alpha-Id, and closedLoopindex parameters according to the SRI-PUSCH-PowerControl IE previously described with reference to Table 1. Therefore, when the UE receives the UL-TCI-state-and-SRI-and-ULPC association IE shown in Table 10 by RRC signaling, and also receives the SRI and UL-TCI in the UL DCI, the UE may determine the UL power control parameter set (e.g., as defined by sri-PUSCH-PowercontrolID in the UL-TCI-state-and-SRI-and-ULPC association IE) to be used for that SRI and UL-TCI based on the association configured in the UL-TCI-state-and-SRI-and-ULPC association IE.

TABLE 10

UL-TCI-state-and-SRI-and-ULPC association ::= SEQUENCE {
   ul-TCI-stat-Id,
   sri-ID,
   sri-PU SCH-PowercontrolID
}

Table 11 shows a structure of the second example dedicated RRC message for configuring an association between an SRI and UL-TCI state pair and a ULPC configuration according to another implementation. In Table 11, the UL-TCIandSRIId parameter may define a ul-TCI-stat-Id and sri-ID pair. The sri-PUSCH-powercontrolID may indicate the ULPC configuration (e.g., a UL power control parameter set) associated with the sri-ID and ul-TCI-stat-Id pair defined by UL-TCIandSRIId. For example, the sri-PUSCH-powercontrolID may define any of the pathlossReferenceRS-Id, p0-Id, alpha-Id, and closedLoopindex parameters according to the SRI-PUSCH-PowerControl IE previously described with reference to Table 1. Therefore, when the UE receives the UL-TCI-state-and-SRI- and ULPC association IE shown in Table 11 by RRC signaling, and also receives the SRI and UL-TCI in the UL DCI, the UE may determine the UL power control parameter set (e.g., as defined by sri-PUSCH-PowercontrolID in the UL-TCI-state-and-SRI-and-ULPC association IE) to be used for that SRI and UL-TCI based on the association configured in the UL-TCI-state-and-SRI-and-ULPC association IE.

TABLE 11

UL-TCI-state-and-SRI-and-ULPC association ::= SEQUENCE {
   UL-TCIandSRIId{
     ul-TCI-stat-Id,
     sri-ID,}
   sri-PU SCH-PowercontrolID
}

Association Between UL-TCI and ULPC Based on MAC-CE

In some aspects of the present disclosure, a UL-TCI may be associated to an uplink power control (ULPC) configuration using a MAC-CE. In these aspects, and as described in detail herein with reference to FIG. 7, the MAC-CE may associate each active TCI to a certain SRI-PUSCH-powercontrolID for PUSCH.

Figure 7:
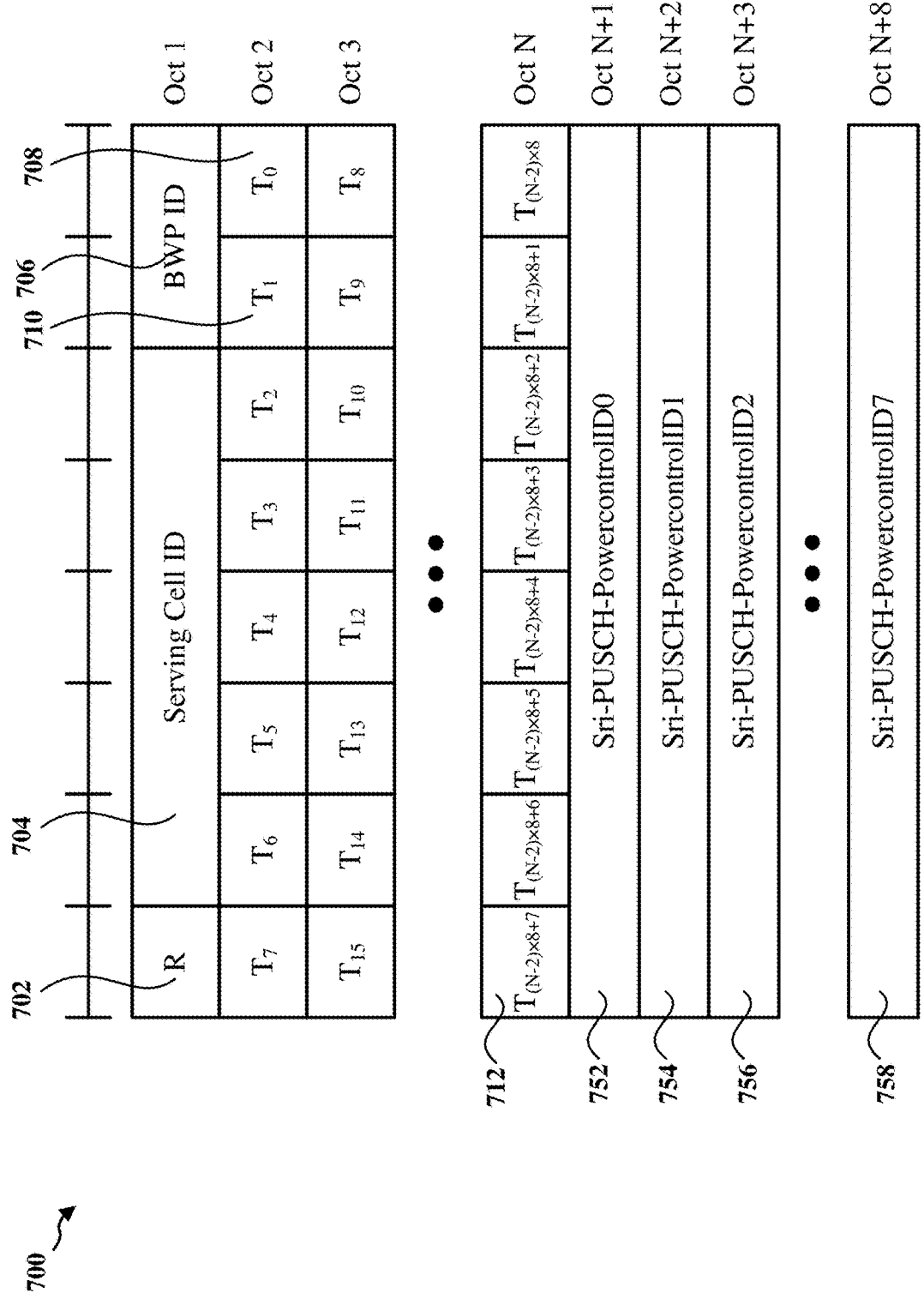
FIG. 7 illustrates an example UE-specific PUSCH MAC-CE for associating active UL-TCI states with a ULPC configuration in accordance with various aspects of the disclosure.

FIG. 7 illustrates an example UE-specific PUSCH MAC-CE 700 for associating active UL-TCI states with a ULPC configuration in accordance with various aspects of the disclosure. As shown in FIG. 7, the UE-specific PUSCH MAC-CE 700 may include a reserved bit field 702, a serving cell ID field 704, a bandwidth part ID (BWP ID) field 706, and a bitmap where each bit in the bitmap (e.g., bit $T_0$ 708, bit $T_1$ 710, ... bit $T_{(N-2)\times 8+7}$ 712) corresponds to a TCI state. For example, a base station may activate up to eight TCI states by setting bits in the bitmap to '1'. Therefore, when a bit (e.g., bit $T_0$ 708) in the bitmap is set to '1', the TCI state corresponding to that bit (e.g., a first TCI state) is activated, whereas when a bit (e.g., bit $T_1$ 710) in the bitmap is set to '0', the TCI state corresponding to that bit (e.g., a second TCI state) is deactivated. The bits set to '1' in the bitmap may be assigned to one of eight possible codepoints in ascending order. For example, if bit $T_0$ 708, bit $T_1$ 710, and bit $T_{(N-2)\times 8+7}$ 712 are set to '1' and the remaining bits in the bitmap are set to '0', then codepoint 0 may be set to $T_0$, codepoint 1 may be set to $T_1$, and codepoint 2 may be set to $T_{(N-2)\times 8+7}$.

As further shown in FIG. 7, one or more octets including a ULPC configuration may be appended to the UE-specific PUSCH MAC-CE 700. Each octet may correspond to a codepoint, and the ULPC configuration indicated in an octet may be associated with the corresponding codepoint. For example, if only one bit in the bitmap of the MAC-CE 700 is set to '1', then the MAC-CE 700 may include the octet N+1 752 including a first ULPC configuration (e.g., SRI-PUSCH-powercontrolID0). Accordingly, the first ULPC configuration (e.g., SRI-PUSCH-powercontrolID0) may be mapped to codepoint 0. As another example, if eight bits in the bitmap of the MAC-CE 700 are set to '1', then the MAC-CE 700 may include the octet N+1 752 including a first ULPC configuration (e.g., SRI-PUSCH-powercontrolID0), the octet N+2 754 including a second ULPC configuration (e.g., SRI-PUSCH-powercontrolID1), the octet N+3 754 including a third ULPC configuration (e.g., SRI-PUSCH-powercontrolID2), and so on up to the final octet N+8 758 including an eighth ULPC configuration (e.g., SRI-PUSCH-powercontrolID7). In this example, the first ULPC configuration (e.g., SRI-PUSCH-powercontrolID0) may be associated with codepoint 0 (e.g., a first TCI state), the second ULPC configuration (e.g., SRI-PUSCH-powercontrolID1) may be associated with codepoint 1 (e.g., a second TCI state), and so on. An example application of the UE-specific PUSCH MAC-CE 700 for four codepoints is described herein with reference to FIG. 8.

Figure 8:
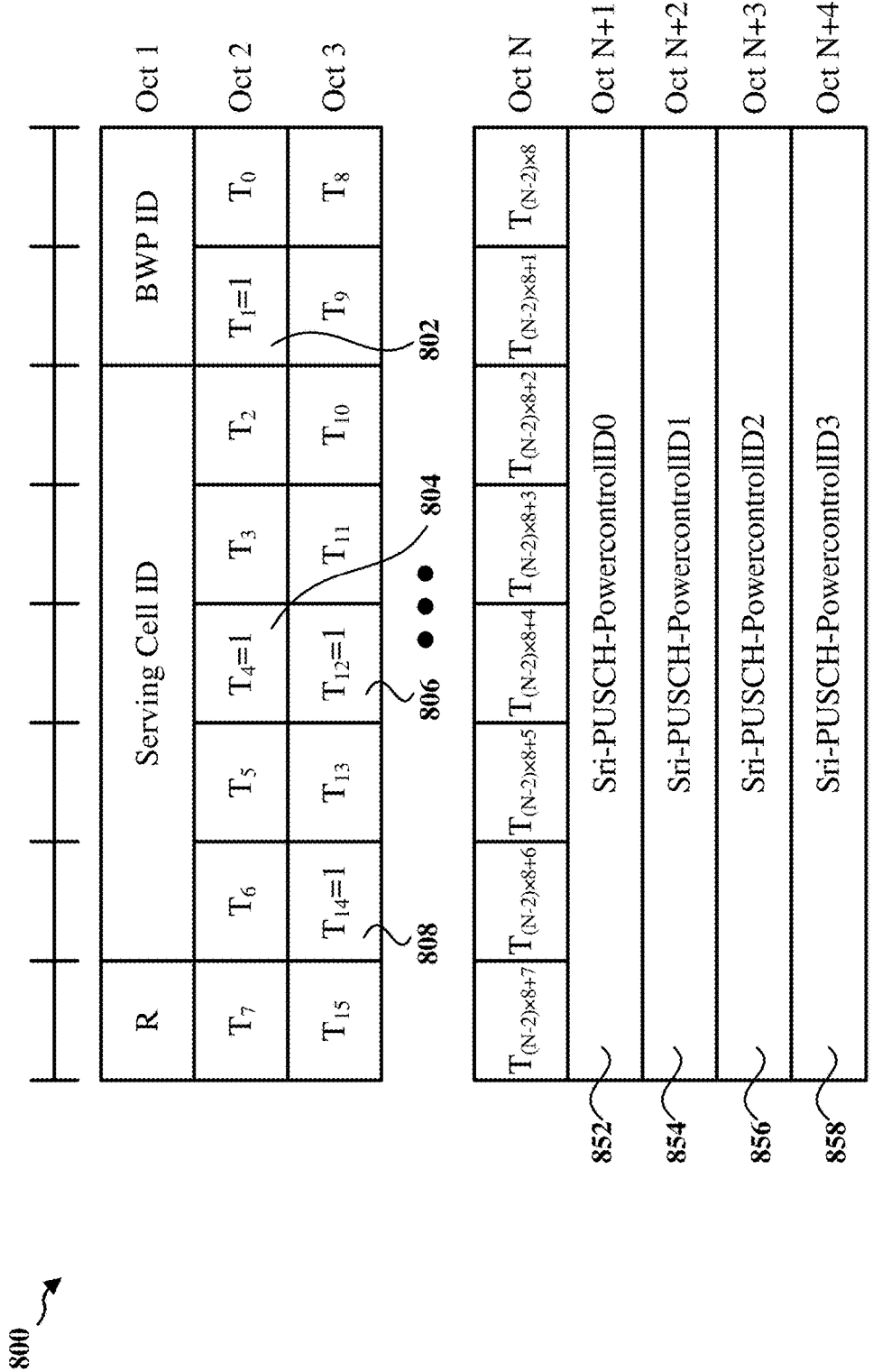
FIG. 8 illustrates an example UE-specific PUSCH MAC-CE for associating active UL-TCI states with a ULPC configuration in accordance with various aspects of the disclosure.

FIG. 8 illustrates an example UE-specific PUSCH MAC-CE 800 for associating active UL-TCI states with a ULPC configuration in accordance with various aspects of the disclosure. As shown in FIG. 8, a base station may activate four TCI states by setting bits $T_1$ 802, $T_4$ 804, $T_{12}$ 806, and $T_{14}$ 808 in the bitmap to '1'. The remaining bits may be set to '0'. Therefore, the TCI states mapped to $T_1$ 802, $T_4$ 804, $T_{12}$ 806, and $T_{14}$ 808 may be respectively mapped to codepoint 0, codepoint 1, codepoint 2, and codepoint 3. As shown in FIG. 8, the UE-specific PUSCH MAC-CE 800 includes four octets 852, 854, 856, 858 respectively corresponding to codepoint 0, codepoint 1, codepoint 2, and codepoint 3. The ULPC configuration included in an octet may be associated with the codepoint corresponding to that octet. For example, codepoint 0 may be associated with a first ULPC configuration (e.g., SRI-PUSCH-powercontrolID0), codepoint 1 may be associated with a second ULPC configuration (e.g., SRI-PUSCH-powercontrolID1), codepoint 2 may be associated with a third ULPC configuration (e.g., SRI-PUSCH-powercontrolID2), and codepoint 3 may be associated with a fourth ULPC configuration (e.g., SRI-PUSCH-powercontrolID3). For example, when UL DCI indicates codepoint 1 (e.g., '001' in a 3-bit field in DCI) for PUSCH, the UE may determine that the UL-TCI state ID is 4 and that the power control parameters for PUSCH should be set according to sri-PUSCH-PowercontrolID1. The UL-TCI state may be defined according to Table 12.

TABLE 12

```
UL-TCI-state ::= SEQUENCE{
    ul-TCI-stat-Id UL-TCI-stat-Id
    servingCellId ServCellIndex
    refereceRS-ID CHOICE}
        ssb-Index SSB-Index sequence {physCellId, PhysCellId}
        csi-RS-Index CSI-RS-Index
        srs SEQUENCE { resource SRS-ResourceId,
        uplinkBWP BWP-Id } }
}
```

In some aspects of the present disclosure, multiple TCI codepoints may be associated with respective uplink power control (ULPC) configurations using a MAC-CE. In these aspects, and as described in detail herein with reference to FIG. 9, the MAC-CE may associate each TCI codepoint to a certain SRI-PUSCH-powercontrolID for PUSCH.

Figure 9:
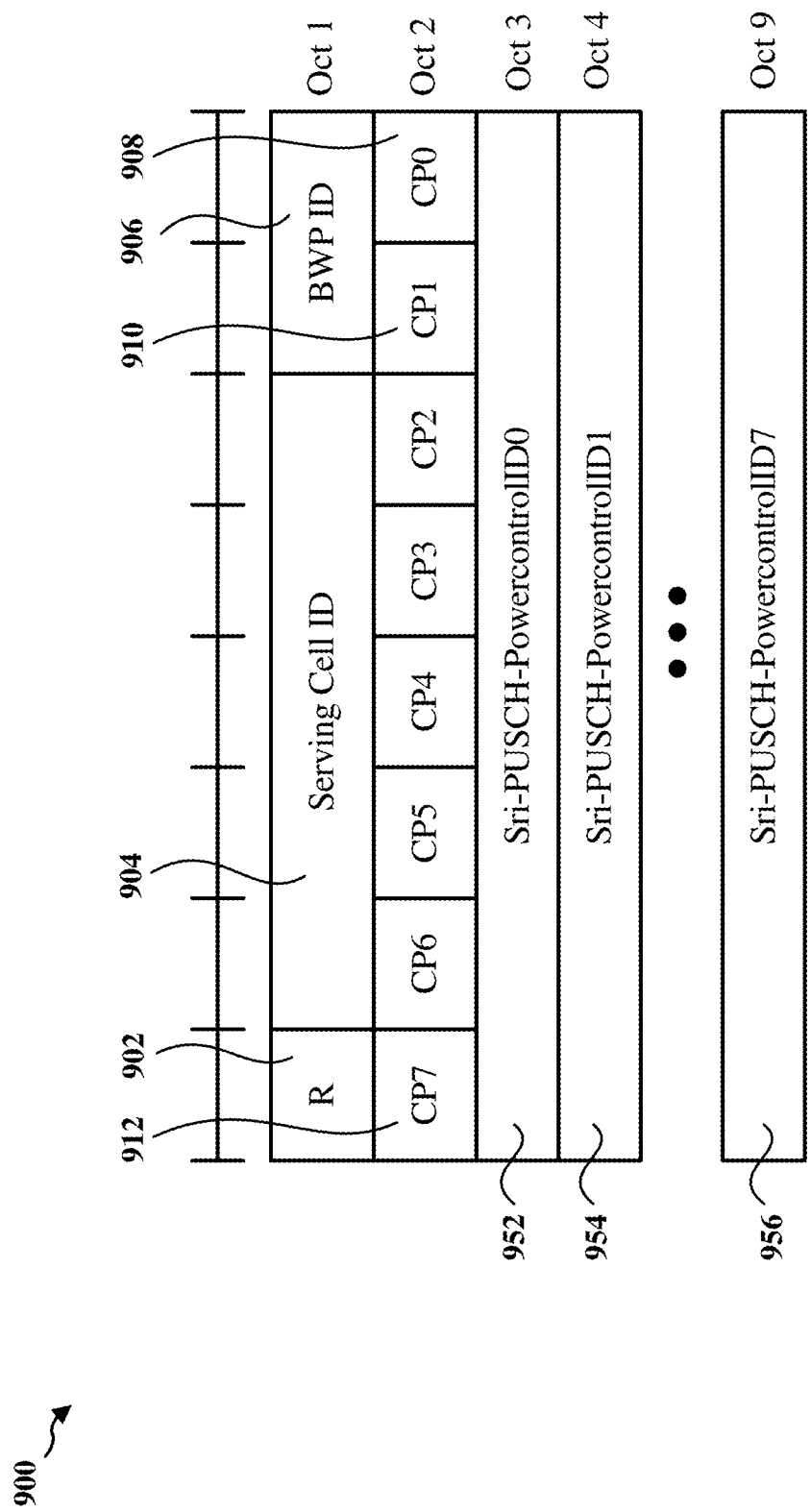
FIG. 9 illustrates an example UE-specific PUSCH MAC-CE for associating TCI codepoints with a ULPC configuration in accordance with various aspects of the disclosure.

FIG. 9 illustrates an example UE-specific PUSCH MAC-CE 900 for associating TCI codepoints with a ULPC configuration in accordance with various aspects of the disclosure. As shown in FIG. 9, the UE-specific PUSCH MAC-CE 900 may include a reserved bit field 902, a serving cell ID field 904, a bandwidth part ID (BWP ID) field 906, and a bitmap where each bit in the bitmap (e.g., bit CP0 908, bit CP1 910, . . . , bit CP7 912) corresponds to a TCI codepoint in the UL DCI. For example, a base station may activate up to eight TCI codepoints (e.g., TCI states) for UL DCI by setting bits in the bitmap to '1'. Therefore, when a bit (e.g., bit CP0 908) in the bitmap is set to '1', the TCI codepoint corresponding to that bit (e.g., codepoint 0) is activated in the UL DCI, whereas when a bit (e.g., bit CP1 910) in the bitmap is set to '0', the TCI codepoint corresponding to that bit (e.g., codepoint 1) is deactivated in the UL DCI.

As further shown in FIG. 9, one or more octets including a ULPC configuration may be appended to the UE-specific PUSCH MAC-CE 900. Each octet may correspond to a codepoint, and the ULPC configuration indicated in an octet may be associated with the corresponding codepoint. For example, if only one bit in the bitmap of the MAC-CE 900 is set to '1', then the MAC-CE 900 may include the octet 3 952 including a first ULPC configuration (e.g., SRI-PUSCH-powercontrolID0). Accordingly, the first ULPC configuration (e.g., SRI-PUSCH-powercontrolID0) may be mapped to codepoint 0. As another example, if eight bits in the bitmap of the MAC-CE 900 are set to '1', then the MAC-CE 900 may include the octet 3 952 including a first ULPC configuration (e.g., SRI-PUSCH-powercontrolID0), the octet 4 954 including a second ULPC configuration (e.g., SRI-PUSCH-powercontrolID1), and so on up to the final octet 9 956 including an eighth ULPC configuration (e.g., SRI-PUSCH-powercontrolID7). In this example, the first ULPC configuration (e.g., SRI-PUSCH-powercontrolID0) may be associated with codepoint 0 (e.g., a first TCI state), the second ULPC configuration (e.g., SRI-PUSCH-powercontrolID1) may be associated with codepoint 1 (e.g., a second TCI state), and so on. An example application of the UE-specific PUSCH MAC-CE 900 for four codepoints is described herein with reference to FIG. 10.

Figure 10:
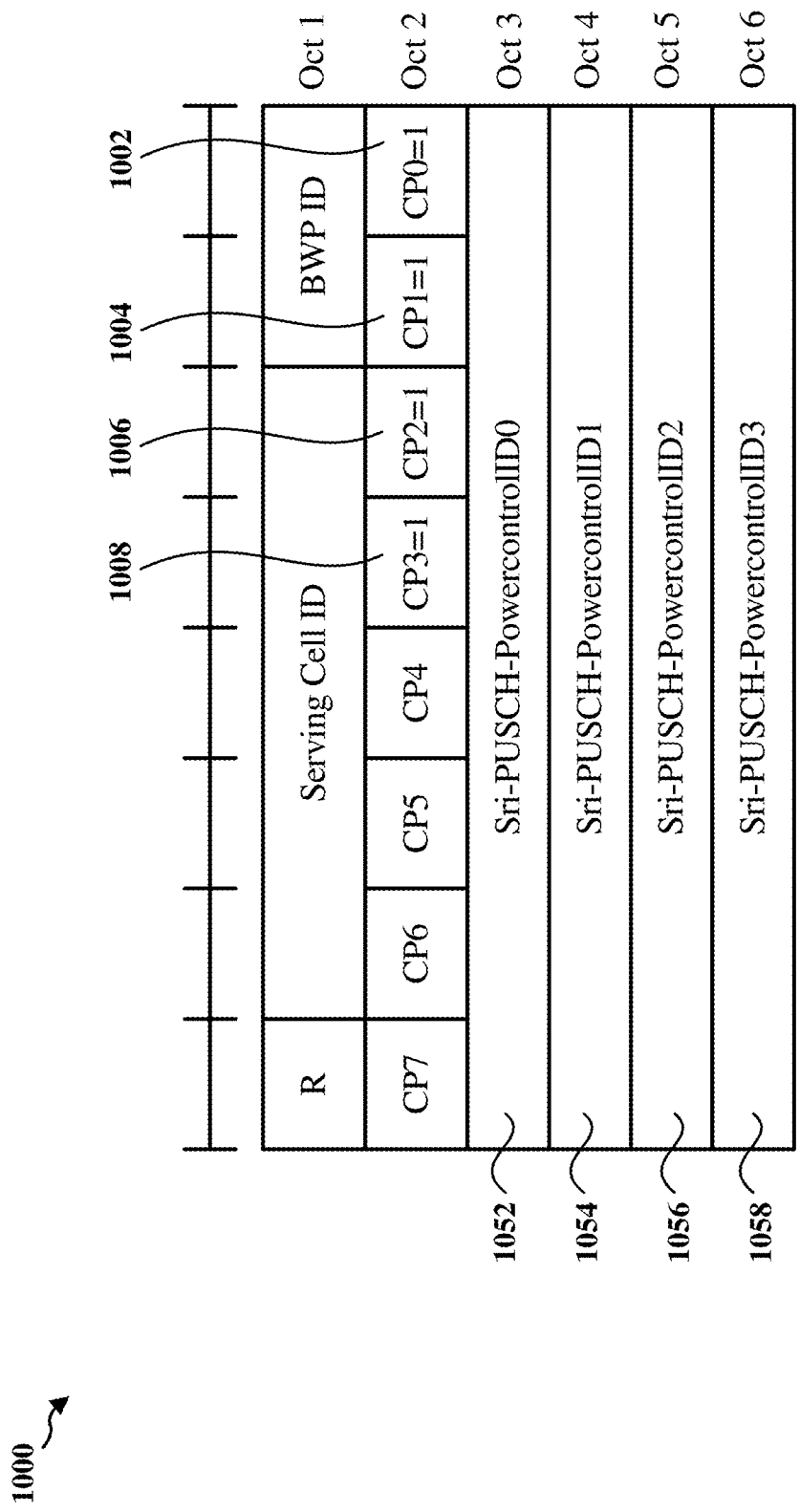
FIG. 10 illustrates an example UE-specific PUSCH MAC-CE for associating multiple TCI codepoints with respective ULPC configurations in accordance with various aspects of the disclosure.

FIG. 10 illustrates an example UE-specific PUSCH MAC-CE 1000 for associating multiple TCI codepoints in UL DCI with respective ULPC configurations in accordance with various aspects of the disclosure. As shown in FIG. 10, a base station may activate four TCI codepoints by setting bits CP0 1002, CP1 1004, CP2 1006, and $CP3_4$ 1008 in the bitmap to '1'. The remaining bits may be set to '0'. As shown in FIG. 10, the UE-specific PUSCH MAC-CE 1000 includes four octets 1052, 1054, 1056, 1058 respectively corresponding to codepoint 0, codepoint 1, codepoint 2, and codepoint 3. The ULPC configuration included in an octet may be associated with the codepoint corresponding to that octet. For example, codepoint 0 may be associated with a first ULPC configuration (e.g., SRI-PUSCH-powercontrolID0), codepoint 1 may be associated with a second ULPC configuration (e.g., SRI-PUSCH-powercontrolID1), codepoint 2 may be associated with a third ULPC configuration (e.g., SRI-PUSCH-powercontrolID2), and codepoint 3 may be associated with a fourth ULPC configuration (e.g., SRI-PUSCH-powercontrolID3). For example, when UL DCI indicates codepoint 2 (e.g., '010' in a 3-bit field in DCI) for PUSCH, the UE may determine the UL-TCI state associated with codepoint 2 and that the power control parameters for PUSCH for that UL-TCI state should be set according to sri-PUSCH-PowercontrolID2.

In some aspects of the present disclosure, a single TCI codepoint may be associated with an uplink power control (ULPC) configuration using a MAC-CE. In these aspects, and as described in detail herein with reference to FIG. 12, the MAC-CE may associate a TCI codepoint to a certain SRI-PUSCH-powercontrolID for PUSCH.

Figure 11:
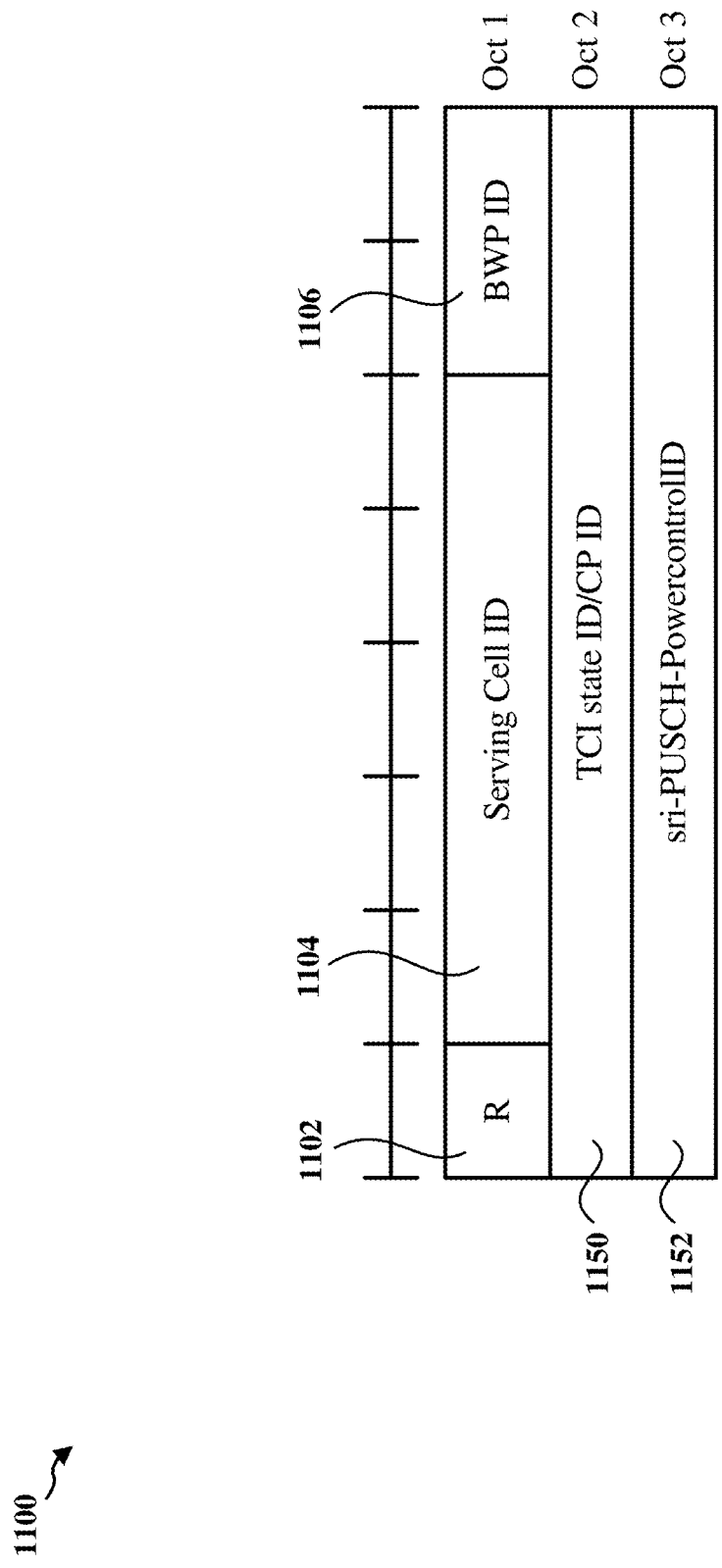
FIG. 11 illustrates an example UE-specific PUSCH MAC-CE for associating a TCI codepoint with a ULPC configuration in accordance with various aspects of the disclosure.

FIG. 11 illustrates an example UE-specific PUSCH MAC-CE 1100 for associating a TCI codepoint with a ULPC configuration in accordance with various aspects of the disclosure. As shown in FIG. 11, the UE-specific PUSCH MAC-CE 1100 may include a reserved bit field 1102, a serving cell ID field 1104, a bandwidth part ID (BWP ID) field 1106, a TCI state ID/codepoint ID (CP ID) field 1150, and an uplink power control (ULPC) configuration field 1152. As shown in FIG. 11, the ULPC configuration field 1152 may include an SRI-PUSCH-powercontrolID. Therefore, the MAC-CE 1100 associates the codepoint (e.g., CP ID) or the TCI state ID in the field 1150 with the ULPC configuration (e.g., sri-PUSCH-powercontrolID) indicated in the ULPC configuration field 1152.

Figure 12:
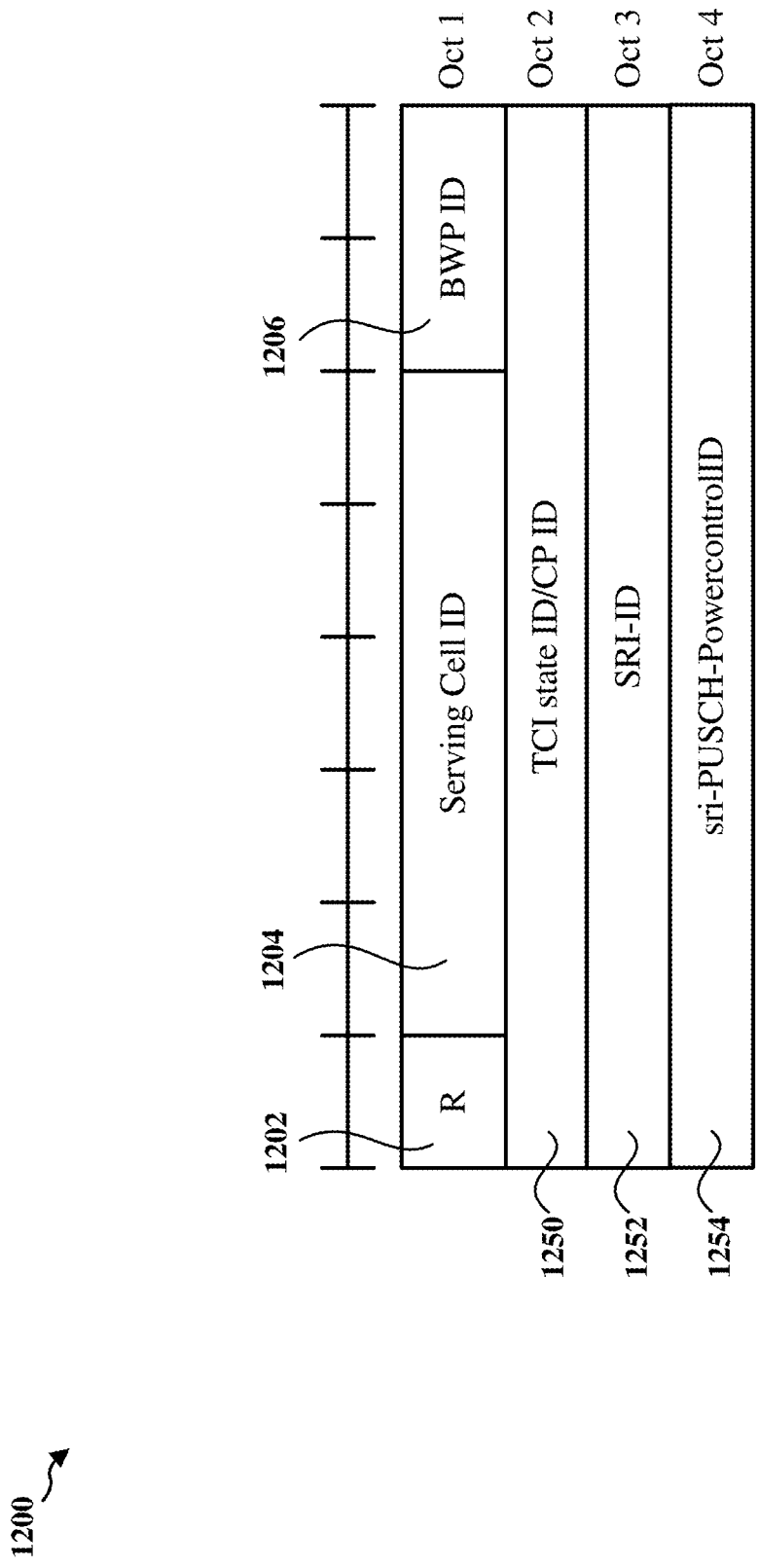
FIG. 12 illustrates an example UE-specific PUSCH MAC-CE for associating a TCI codepoint with a ULPC configuration in accordance with various aspects of the disclosure.

FIG. 12 illustrates an example UE-specific PUSCH MAC-CE 1200 for associating a TCI codepoint with a ULPC configuration in accordance with various aspects of the disclosure. As shown in FIG. 12, the UE-specific PUSCH MAC-CE 1200 may include a reserved bit field 1202, a serving cell ID field 1204, a bandwidth part ID (BWP ID) field 1206, a TCI state ID/codepoint ID (CP ID) field 1250, an SRI-ID field 1252, and an uplink power control (ULPC) configuration field 1254. As shown in FIG. 12, the ULPC configuration field 1254 may include an SRI-PUSCH-powercontrolID. Therefore, the MAC-CE 1200 associates the codepoint (e.g., CP ID) or the TCI state ID in the field 1250 and the SRI-ID indicated in the SRI-ID field 1252 with the ULPC configuration (e.g., sri-PUSCH-powercontrolID) indicated in the ULPC configuration field 1254.

Figure 13:
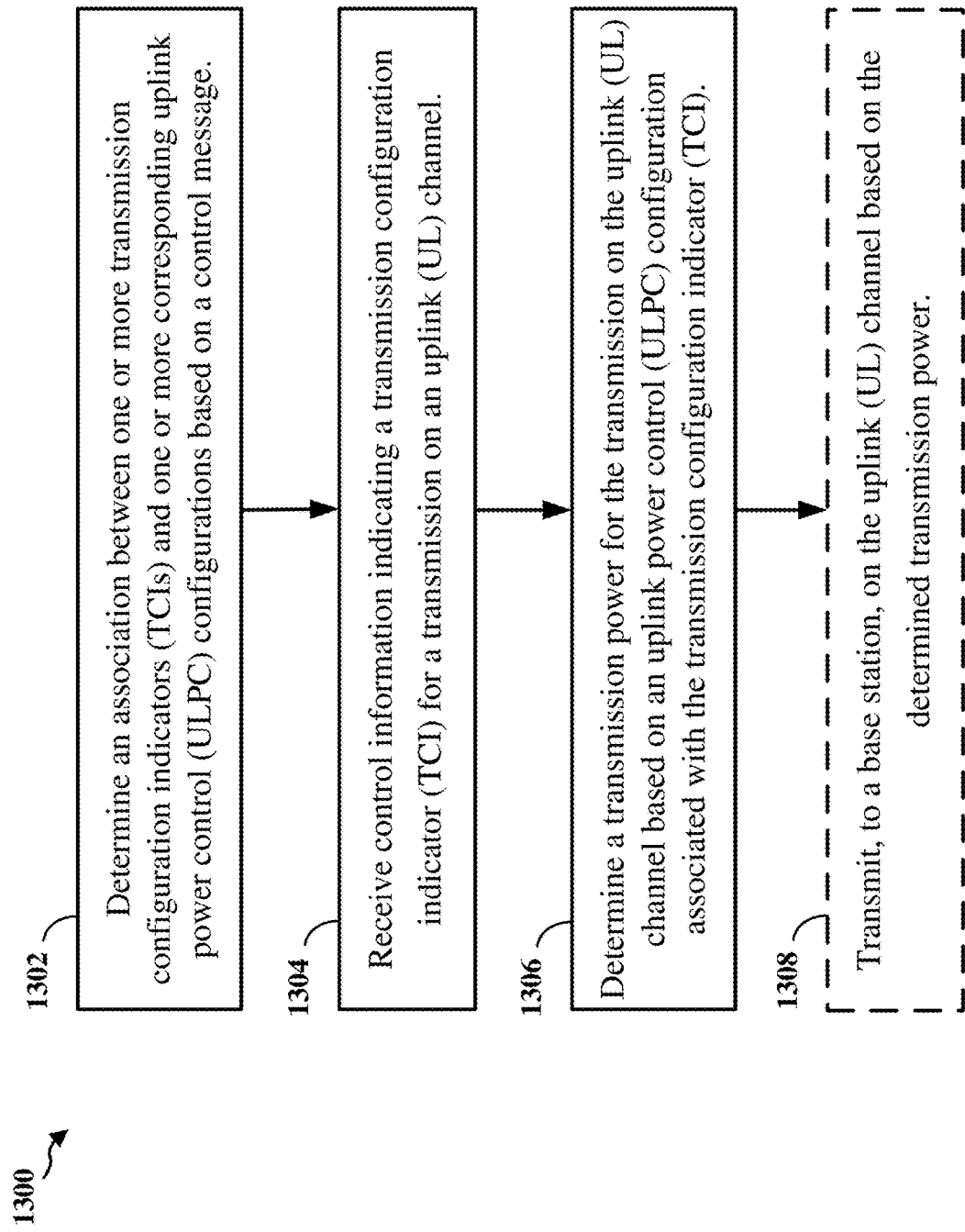
FIG. 13 is a flowchart of a method of wireless communication.

FIG. 13 is a flowchart 1300 of a method of wireless communication. The method may be performed by a UE (e.g., the UE 104, 402; the apparatus 1502/1502'; the processing system 1614, which may include the memory 360 and which may be the entire UE 402 or a component of the UE 402, such as the TX processor 368, the RX processor 356, and/or the controller/processor 359).

At 1302, the UE determines an association between one or more transmission configuration indicators (TCIs) and one or more corresponding uplink power control (ULPC) configurations based on a control message (e.g., an RRC message from a base station). In some aspects of the disclosure, the association between the one or more transmission configuration indicators (TCIs) and the one or more corresponding uplink power control (ULPC) configurations is a direct association or an indirect association. In some aspects of the disclosure, the uplink power control (ULPC) configuration (e.g., Table 1) includes a power control parameter set, the power control parameter set containing at least one of a target signal-to-interference-plus-noise-ratio (SINR), a path loss compensation factor, a path loss downlink reference signal (RS), or a closed loop index value.

In some aspects of the disclosure, the association between the one or more transmission configuration indicators (TCIs) and the one or more corresponding uplink power control (ULPC) configurations is a direct association. In these aspects, the control message includes transmission configuration indicator (TCI) parameters and the power control parameter set (e.g., Table 5).

In some aspects of the disclosure, the association between the one or more transmission configuration indicators (TCIs) and the one or more corresponding uplink power control (ULPC) configurations is the indirect association. In these aspects, the one or more corresponding uplink power control (ULPC) configurations are defined by reference to a power control information element (IE) (e.g., Table 6).

In some aspects of the disclosure, the control message is a dedicated radio resource control (RRC) message, and the control information excludes a sounding reference signal resource indication (SRI) field.

In some aspects of the disclosure, the control message is a dedicated radio resource control (RRC) message. In these aspects, the control information further includes a sounding reference signal resource indication (SRI) field. The control message (e.g., Table 10, Table 11) may indicate an association between an SRI value and a transmission configuration indicator (TCI) value pair and a corresponding uplink power control (ULPC) configuration (e.g., sri-PUSCH-PowercontrolID).

In some aspects of the disclosure, the control message is a MAC-CE (e.g., MAC-CE 700, 800). The MAC-CE activates the one or more transmission configuration indicators (TCIs) and indicates the one or more corresponding uplink power control (ULPC) configurations for the activated one or more transmission configuration indicators (TCIs). In other aspects, the control message is a MAC-CE (e.g., MAC-CE 900, 1000). The MAC-CE is configured to associate multiple codepoints representing the one or more transmission configuration indicators (TCIs) with the one or more corresponding uplink power control (ULPC) configurations. In some aspects of the disclosure, the control message is a MAC-CE (e.g., MAC-CE 1100). The MAC-CE is configured to associate a single codepoint representing one of the one or more transmission configuration indicators (TCIs) with one of the one or more corresponding uplink power control (ULPC) configurations. In some aspects of the disclosure, the control message is a MAC-CE (e.g., MAC-CE 1200). The MAC-CE is configured to associate a single codepoint representing one of the one or more transmission configuration indicators (TCIs) and a single sounding reference signal resource indication (SRI) value with one of the one or more corresponding uplink power control (ULPC) configurations.

At 1304, the UE receives control information indicating a transmission configuration indicator (TCI) for a transmission on an uplink (UL) channel Finally, at 1306, the UE determines a transmission power for the transmission on the uplink (UL) channel based on an uplink power control (ULPC) configuration associated with the transmission configuration indicator (TCI).

Figure 14:
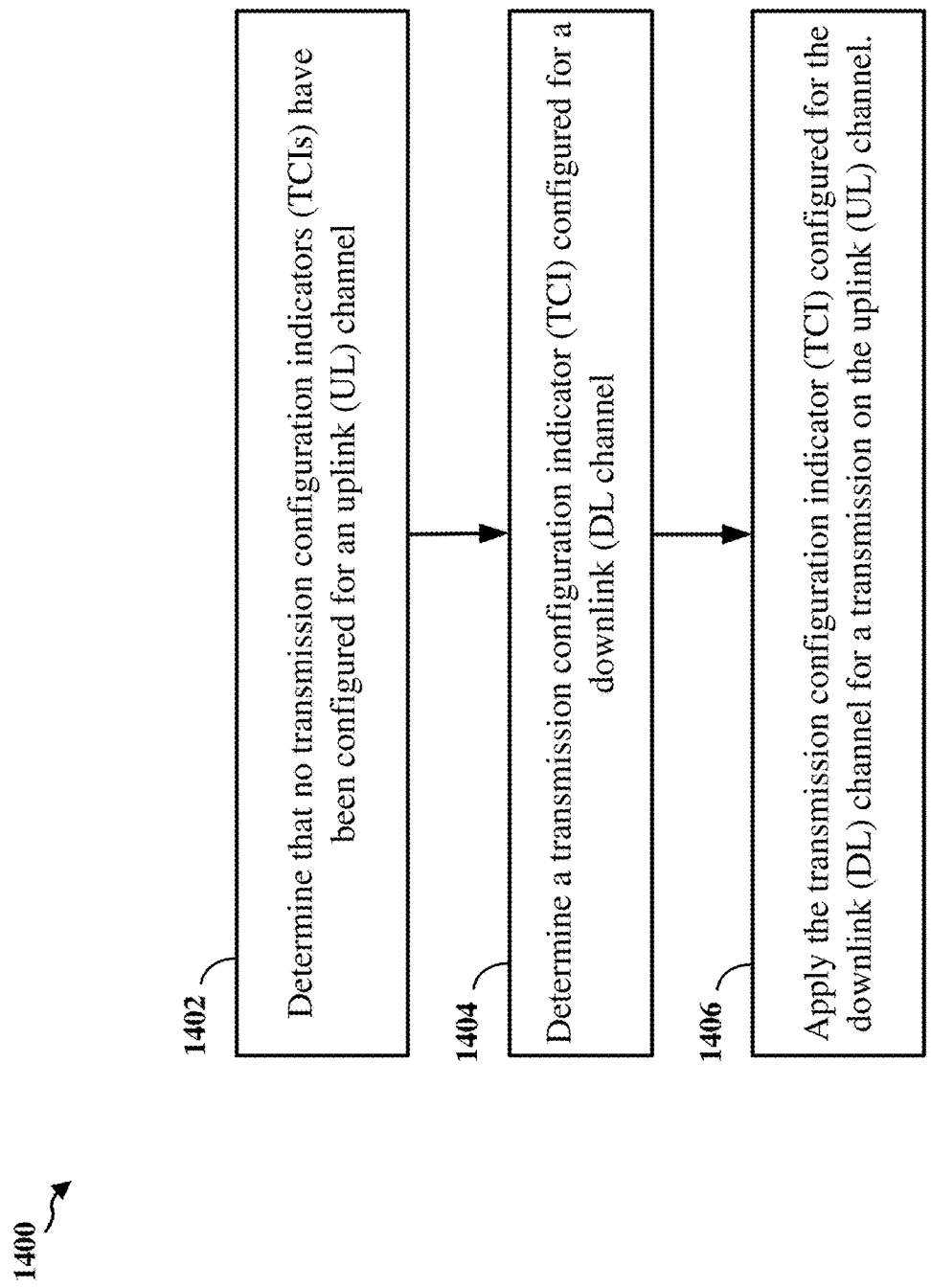
FIG. 14 is a flowchart of a method of wireless communication.

FIG. 14 is a flowchart 1400 of a method of wireless communication. The method may be performed by a UE (e.g., the UE 104, 402; the apparatus 1502/1502'; the processing system 1614, which may include the memory 360 and which may be the entire UE 402 or a component of the UE 402, such as the TX processor 368, the RX processor 356, and/or the controller/processor 359).

At 1402, the UE determines that no transmission configuration indicators (TCIs) have been configured for an uplink (UL) channel.

At 1404, the UE determines a transmission configuration indicator (TCI) configured for a downlink (DL) channel.

Finally, at 1406, the UE applies the transmission configuration indicator (TCI) configured for the downlink (DL) channel for a transmission in the uplink (UL) channel.

Figure 15:
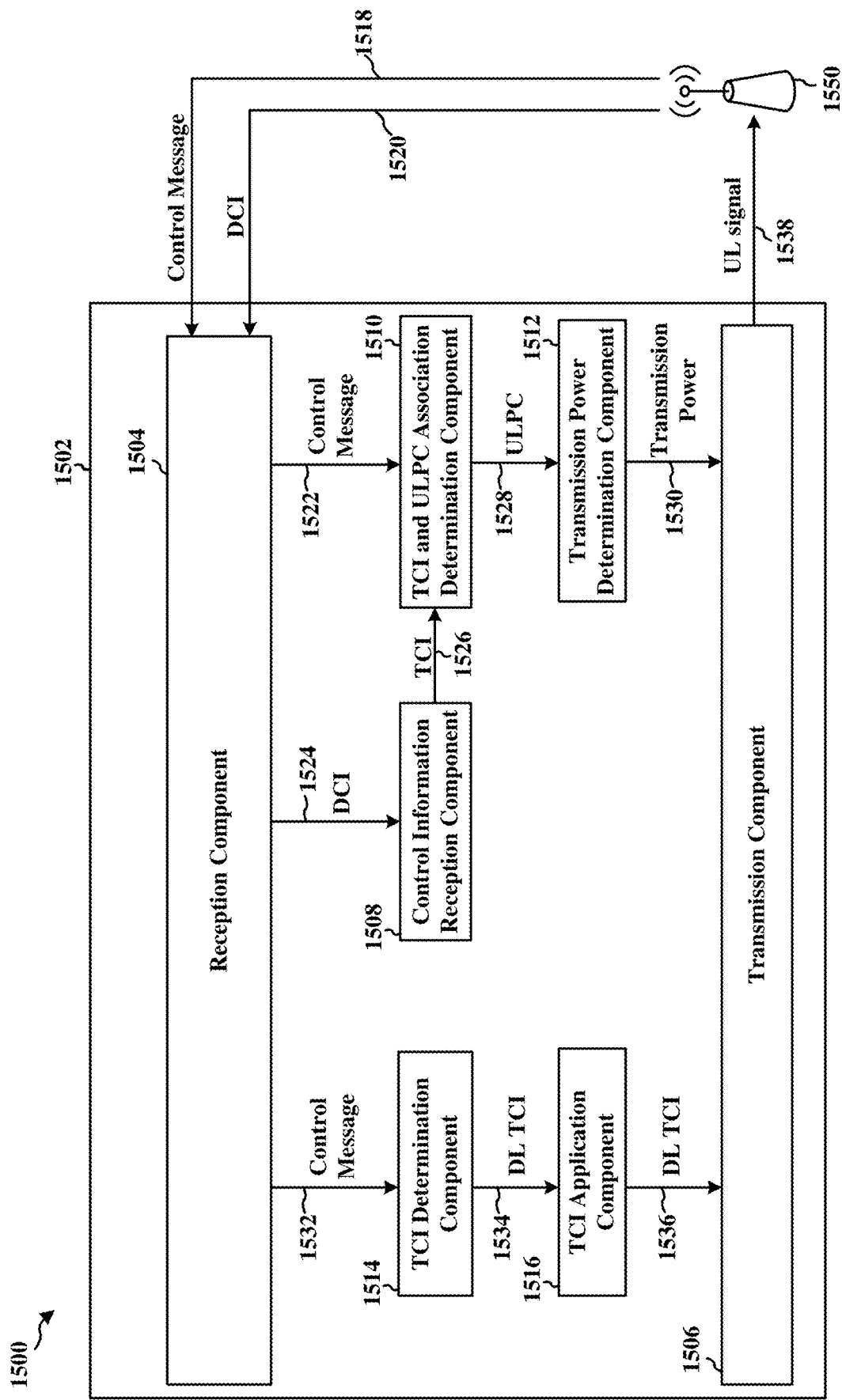
FIG. 15 is a conceptual data flow diagram illustrating the data flow between different means/components in an example apparatus.

FIG. 15 is a conceptual data flow diagram 1500 illustrating the data flow between different means/components in an example apparatus 1502. The apparatus may be a UE. The apparatus includes a reception component 1504 that receives a control message 1518 and a DCI message 1520. In some examples, the control message 1518 may be a radio resource control (RRC) message (e.g., message 406 in FIG. 4). In some examples, the control message 1518 may be a MAC-CE (e.g., MAC-CE 700, 800, 900, 1000, 1100, 1200). The apparatus further includes a transmission component 1506 that transmits at least one UL signal 1538 to the base station 1550. The apparatus further includes a control information reception component 1508 that receives control information (e.g., DCI 1524) indicating a transmission configuration indicator (TCI) (e.g., TCI 1526) for a transmission on an uplink (UL) channel. The control information may include ULPC configuration information in a field for the TCI 1526.

The apparatus further includes a TCI and ULPC association determination component 1510 that determines an association between one or more transmission configuration indicators (TCIs) and one or more corresponding uplink power control (ULPC) configurations (e.g., ULPC configuration 1528) based on a control message (e.g., control message 1522). The apparatus further includes a transmission power determination component 1512 that determines a transmission power (e.g., transmission power 1530) for the transmission on the uplink (UL) channel based on an uplink power control (ULPC) configuration (e.g., ULPC configuration 1528) associated with the transmission configuration indicator (TCI)

The apparatus further includes a TCI determination component 1514 that determines (e.g., based on the control message 1532) that no transmission configuration indicators (TCIs) have been configured for an uplink (UL) channel and determines (e.g., based on the control message 1532) a transmission configuration indicator (TCI) (e.g., DL TCI 1534) configured for a downlink (DL) channel, and a TCI application component 1516 that applies the transmission configuration indicator (TCI) (e.g., DL TCI 1536) configured for the downlink (DL) channel for a transmission in the uplink (UL) channel.

The apparatus may include additional components that perform each of the blocks of the algorithm in the aforementioned flowcharts of FIGS. 13 and 14. As such, each block in the aforementioned flowcharts of FIGS. 13 and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
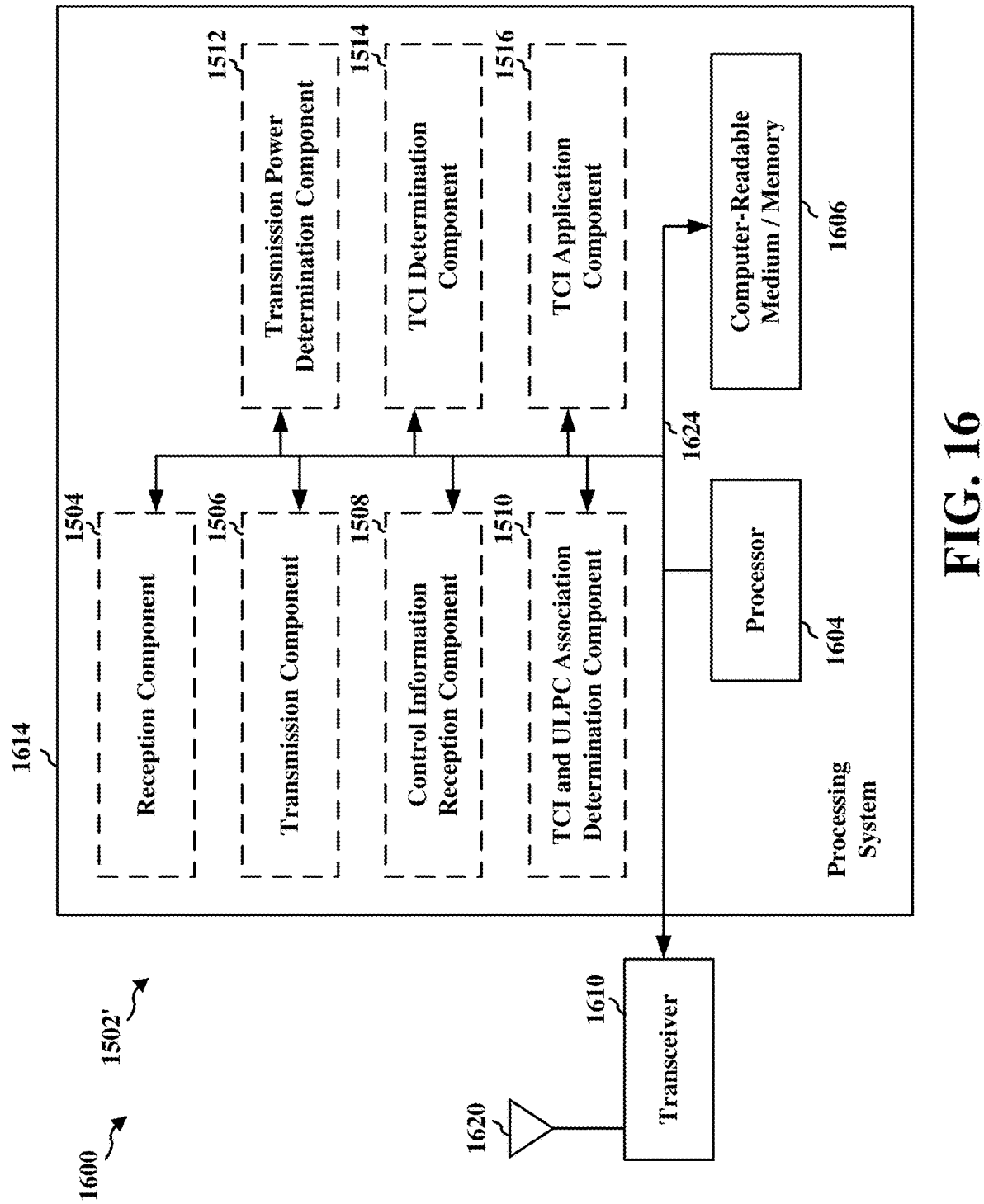
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, 1508, 1510, 1512, 1514, 1516, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1506, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1506, 1508, 1510, 1512, 1514, 1516. The components may be software components running in the processor 1604, resident/stored in the computer readable medium/memory 1606, one or more hardware components coupled to the processor 1604, or some combination thereof. The processing system 1614 may be a component of the UE 350 and may include the memory 360 and/or at least one of the TX processor 368, the RX processor 356, and the controller/processor 359. Alternatively, the processing system 1614 may be the entire UE (e.g., see 350 of FIG. 3).

In one configuration, the apparatus 1502/1502' for wireless communication includes means for determining an association between one or more transmission configuration indicators (TCIs) and one or more corresponding uplink power control (ULPC) configurations based on a control message, means for receiving control information indicating a transmission configuration indicator (TCI) for a transmission on an uplink (UL) channel, and means for determining a transmission power for the transmission on the uplink (UL) channel based on an uplink power control (ULPC) configuration associated with the transmission configuration indicator (TCI), means for determining that no transmission configuration indicators (TCIs) have been configured for an uplink (UL) channel, means for determining a transmission configuration indicator (TCI) configured for a downlink (DL) channel, and means for applying the transmission configuration indicator (TCI) configured for the downlink (DL) channel for a transmission in the uplink (UL) channel.

The aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a user equipment (UE), comprising:
   determining an association between one or more transmission configuration indicators (TCIs) and one or more corresponding uplink power control (ULPC) configurations based on a control message, wherein the control message is a medium access control (MAC) control element (MAC-CE) configured to associate multiple codepoints representing the one or more transmission configuration indicators (TCIs) with the one or more corresponding uplink power control (ULPC) configurations;

receiving control information indicating a transmission configuration indicator (TCI) for a transmission on an uplink (UL) channel; and determining a transmission power for the transmission on the uplink (UL) channel based on an uplink power control (ULPC) configuration associated with the transmission configuration indicator (TCI).

2. The method of claim 1, wherein the uplink power control (ULPC) configuration includes a power control parameter set, the power control parameter set containing at least one of a target signal-to-interference-plus-noise-ratio (SINR), a path loss compensation factor, a path loss downlink reference signal (RS), or a closed loop index value.

3. The method of claim 1, wherein the association between the one or more transmission configuration indicators (TCIs) and the one or more corresponding uplink power control (ULPC) configurations is a direct association or an indirect association.

4. The method of claim 3, wherein the association between the one or more transmission configuration indicators (TCIs) and the one or more corresponding uplink power control (ULPC) configurations is the direct association, wherein the control message includes transmission configuration indicator (TCI) parameters and a power control parameter set.

5. The method of claim 3, wherein the association between the one or more transmission configuration indicators (TCIs) and the one or more corresponding uplink power control (ULPC) configurations is the indirect association, and wherein the one or more corresponding uplink power control (ULPC) configurations are defined by reference to a power control information element (IE).

6. The method of claim 1, the MAC-CE activates the one or more transmission configuration indicators (TCIs) and indicates the one or more corresponding uplink power control (ULPC) configurations for the activated one or more transmission configuration indicators (TCIs).

7. The method of claim 1, further comprising:
transmitting, to a base station, on the uplink (UL) channel based on the determined transmission power.

8. A method of wireless communication for a user equipment (UE), comprising:
determining an association between one or more transmission configuration indicators (TCIs) and one or more corresponding uplink power control (ULPC) configurations based on a control message;
receiving control information indicating a transmission configuration indicator (TCI) for a transmission on an uplink (UL) channel, wherein the control message is a dedicated radio resource control (RRC) message, wherein the control information further includes a sounding reference signal resource indication (SRI) field, and wherein the control message indicates an association between an SRI value and a transmission configuration indicator (TCI) value pair and a corresponding uplink power control (ULPC) configuration; and
determining a transmission power for the transmission on the uplink (UL) channel based on an uplink power control (ULPC) configuration associated with the transmission configuration indicator (TCI).

9. A method of wireless communication for a user equipment (UE), comprising:
determining an association between one or more transmission configuration indicators (TCIs) and one or more corresponding uplink power control (ULPC) configurations based on a control message, wherein the control message is a medium access control (MAC) control element (MAC-CE), wherein the MAC-CE is configured to associate a single codepoint representing one of the one or more transmission configuration indicators (TCIs) with one of the one or more corresponding uplink power control (ULPC) configurations;
receiving control information indicating a transmission configuration indicator (TCI) for a transmission on an uplink (UL) channel; and
determining a transmission power for the transmission on the uplink (UL) channel based on an uplink power control (ULPC) configuration associated with the transmission configuration indicator (TCI).

10. A method of wireless communication for a user equipment (UE), comprising:
determining an association between one or more transmission configuration indicators (TCIs) and one or more corresponding uplink power control (ULPC) configurations based on a control message, wherein the control message is a medium access control (MAC) control element (MAC-CE), wherein the MAC-CE is configured to associate a single codepoint representing one of the one or more transmission configuration indicators (TCIs) and a single sounding reference signal resource indication (SRI) value with one of the one or more corresponding uplink power control (ULPC) configurations;
receiving control information indicating a transmission configuration indicator (TCI) for a transmission on an uplink (UL) channel; and
determining a transmission power for the transmission on the uplink (UL) channel based on an uplink power control (ULPC) configuration associated with the transmission configuration indicator (TCI).

11. An apparatus for wireless communication, comprising:
a memory; and
at least one processor coupled to the memory and configured to:
determine an association between one or more transmission configuration indicators (TCIs) and one or more corresponding uplink power control (ULPC) configurations based on a control message, wherein the control message is a medium access control (MAC) control element (MAC-CE), wherein the MAC-CE is configured to associate multiple codepoints representing the one or more transmission configuration indicators (TCIs) with the one or more corresponding uplink power control (ULPC) configurations;
receive control information indicating a transmission configuration indicator (TCI) for a transmission on an uplink (UL) channel; and
determine a transmission power for the transmission on the uplink (UL) channel based on an uplink power control (ULPC) configuration associated with the transmission configuration indicator (TCI).

12. The apparatus of claim 11, wherein the uplink power control (ULPC) configuration includes a power control parameter set, the power control parameter set containing at least one of a target signal-to-interference-plus-noise-ratio (SINR), a path loss compensation factor, a path loss downlink reference signal (RS), or a closed loop index value.

13. The apparatus of claim 11, wherein the association between the one or more transmission configuration indicators (TCIs) and the one or more corresponding uplink power control (ULPC) configurations is a direct association or an indirect association.

14. The apparatus of claim 13, wherein the association between the one or more transmission configuration indicators (TCIs) and the one or more corresponding uplink power control (ULPC) configurations is the direct association, wherein the control message includes transmission configuration indicator (TCI) parameters and a power control parameter set.

15. The apparatus of claim 13, wherein the association between the one or more transmission configuration indicators (TCIs) and the one or more corresponding uplink power control (ULPC) configurations is the indirect association, and wherein the one or more corresponding uplink power control (ULPC) configurations are defined by reference to a power control information element (IE).

16. The apparatus of claim 11, wherein the MAC-CE activates the one or more transmission configuration indicators (TCIs) and indicates the one or more corresponding uplink power control (ULPC) configurations for the activated one or more transmission configuration indicators (TCIs).

17. The apparatus of claim 11, wherein the MAC-CE is configured to associate a single codepoint representing one of the one or more transmission configuration indicators (TCIs) with one of the one or more corresponding uplink power control (ULPC) configurations.

18. The apparatus of claim 11, wherein the MAC-CE is configured to associate a single codepoint representing one of the one or more transmission configuration indicators (TCIs) and a single sounding reference signal resource indication (SRI) value with one of the one or more corresponding uplink power control (ULPC) configurations.

19. The apparatus of claim 11, wherein the at least one processor is further configured to:
transmit, to a base station, on the uplink (UL) channel based on the determined transmission power.

20. An apparatus for wireless communication, comprising:
means for determining an association between one or more transmission configuration indicators (TCIs) and one or more corresponding uplink power control (ULPC) configurations based on a control message, wherein the control message is a medium access control (MAC) control element (MAC-CE), wherein the MAC-CE is configured to associate multiple codepoints representing the one or more transmission configuration indicators (TCIs) with the one or more corresponding uplink power control (ULPC) configurations;
means for receiving control information indicating a transmission configuration indicator (TCI) for a transmission on an uplink (UL) channel; and
means for determining a transmission power for the transmission on the uplink (UL) channel based on an uplink power control (ULPC) configuration associated with the transmission configuration indicator (TCI).

21. A non-transitory computer-readable medium storing computer executable code, the code when executed by a processor cause the processor to:
determine an association between one or more transmission configuration indicators (TCIs) and one or more corresponding uplink power control (ULPC) configurations based on a control message, wherein the control message is a medium access control (MAC) control element (MAC-CE), wherein the MAC-CE is configured to associate multiple codepoints representing the one or more transmission configuration indicators (TCIs) with the one or more corresponding uplink power control (ULPC) configurations;
receive control information indicating a transmission configuration indicator (TCI) for a transmission on an uplink (UL) channel; and
determine a transmission power for the transmission on the uplink (UL) channel based on an uplink power control (ULPC) configuration associated with the transmission configuration indicator (TCI).

* * * * *